United States Patent
Kim et al.

(10) Patent No.: US 10,681,755 B2
(45) Date of Patent: Jun. 9, 2020

(54) ROUTING METHOD AND NETWORK ENTITY PERFORMING SAME

(71) Applicant: 2IP CO., LTD., Seoul (KR)

(72) Inventors: Tae Jung Kim, Seoul (KR); Kwang Hyun Cho, Seoul (KR)

(73) Assignee: 2IP CO., LTD., Seoul (KR)

( * ) Notice: Subject to any disclaimer, the term of this patent is extended or adjusted under 35 U.S.C. 154(b) by 75 days.

(21) Appl. No.: 15/740,811

(22) PCT Filed: Jun. 30, 2016

(86) PCT No.: PCT/KR2016/007027
§ 371 (c)(1),
(2) Date: Dec. 29, 2017

(87) PCT Pub. No.: WO2017/003215
PCT Pub. Date: Jan. 5, 2017

(65) Prior Publication Data
US 2018/0343693 A1  Nov. 29, 2018

(30) Foreign Application Priority Data

Jun. 30, 2015 (KR) .................. 10-2015-0092951
Jul. 10, 2015 (KR) .................. 10-2015-0098354
(Continued)

(51) Int. Cl.
*H04W 76/14* (2018.01)
*H04W 4/21* (2018.01)
(Continued)

(52) U.S. Cl.
CPC ......... *H04W 76/14* (2018.02); *H04L 63/0428* (2013.01); *H04W 4/21* (2018.02); *H04L 51/00* (2013.01)

(58) Field of Classification Search
CPC ... H04L 67/104; H04L 63/061; H04L 63/062; H04L 51/00; H04L 63/0428; H04W 4/21; H04W 76/14
See application file for complete search history.

(56) References Cited

U.S. PATENT DOCUMENTS 10,129,412 B1 * 11/2018 Singh .................. H04M 3/42
2009/0225986 A1    9/2009 Gennaro et al.
(Continued)

FOREIGN PATENT DOCUMENTS

KR      20020003541 A    1/2002
KR    1020030008952 A    1/2003
(Continued)

OTHER PUBLICATIONS

International Search Report dated Oct. 10, 2016 for PCT/KR2016/007027, citing the above references.

*Primary Examiner* — Quoc Thai N Vu
(74) *Attorney, Agent, or Firm* — Cantor Colburn LLP

(57) ABSTRACT

A method for operating a communication device is disclosed. One embodiment includes the steps of: generating an intermediary key corresponding to peer to peer (P2P) communication between a client and a counterpart client; transmitting the intermediary key to the counterpart client; obtaining an intermediary path corresponding to the intermediary key; receiving the data through the intermediary path from the client that did not receive an acknowledgement for data transmitted to the counterpart client because of a change of a network address of the counterpart client; and transmitting the data to the counterpart client if the counterpart client accesses the changed network address by using the intermediary key.

14 Claims, 13 Drawing Sheets

(30) Foreign Application Priority Data

Feb. 17, 2016 (KR) ........................ 10-2016-0018413
Jun. 27, 2016 (KR) ........................ 10-2016-0079956

(51) Int. Cl.
*H04L 29/06* (2006.01)
*H04L 12/58* (2006.01)

(56) References Cited

U.S. PATENT DOCUMENTS

2015/0312352 A1* 10/2015 Shamilian ............. H04L 67/141
　　　　　　　　　　　　　　　　　　　726/6
2016/0149899 A1*  5/2016 Abbott .................. H04L 9/0825
　　　　　　　　　　　　　　　　　　　713/171

FOREIGN PATENT DOCUMENTS

| | | |
|---|---|---|
| KR | 1020070015488 A | 2/2007 |
| KR | 1020070082682 A | 8/2007 |
| KR | 101240552 B1 | 3/2013 |
| KR | 1020150047554 A | 5/2015 |
| WO | 2013048038 A2 | 4/2013 |
| WO | 2015088296 A1 | 6/2015 |

* cited by examiner

ROUTING METHOD AND NETWORK ENTITY PERFORMING SAME

TECHNICAL FIELD

The following embodiments relate to a routing method and a network entity that performs the routing method.

BACKGROUND ART

Currently, a voice call based legacy communication fee scheme is being converted to a data based scheme. The telecommunication market has evolved from a 1 generation (1G) of an analog scheme to 2G (digital) of a digital scheme, from 2G to 3G for data communication, and from 3G to 4G that has expanded a data transmission bandwidth over 3G.

The recent mobile communication technique targets 5G. For the development to 5G, there is a need to expand a communication bandwidth and to enhance a data transmission rate. Various communication schemes may be applied to enhance the data transmission rate.

In the case of using a peer-to-peer (P2P) scheme or a relay scheme among the various communication schemes, a network routing scheme is required to guarantee a quality of service (QoS) capable of supporting a voice call.

Also, in the case of using the P2P scheme or the relay scheme among the various communication schemes, that is, in the case of communication that does not pass through a network entity directly managed by a mobile communication provider, it is difficult to carry out billing for a data use amount.

DISCLOSURE OF INVENTION

Technical Solutions

According to an aspect, there is provided a method of operating a communication device, the method including generating an intermediary key corresponding to a peer-to-peer (P2P) communication between a client and a counterpart client; transmitting the intermediary key to the counterpart client; obtaining an intermediary path corresponding to the intermediary key; receiving, from the client that does not receive an acknowledgement to data transmitted to the counterpart client due to a change of a network address of the counterpart client, the data through the intermediary path; and transmitting the data to the counterpart client when the counterpart client is accessed using the intermediary key.

The generating of the intermediary key may include generating the intermediary key in response to connection to the counterpart client that receives a P2P communication request of the client from a server.

The server may receive the intermediary key from the counterpart client and transmit the intermediary key to the client, and the obtaining of the intermediary path may include obtaining the intermediary path when the intermediary key is received from the client.

The intermediary path may include a dedicated room of the client and the counterpart client that maintain the intermediary key.

The transmitting of the data to the counterpart client may include receiving an access request including the intermediary key from the counterpart client having the changed network address; and allowing an access in response to the access request based on the intermediary key.

The intermediary key may correspond to a threshold or may be generated based on unique information of the client and the counterpart client.

The client may receive an acknowledgement to data received by the counterpart client from the communication device and may transmit data to the changed network address of the counterpart client.

According to an aspect, there is provided a method of operating a server, the method including receiving a P2P communication request of a client and transmitting the P2P communication request to a counterpart client; generating an intermediary key when the counterpart client accesses the server, and transmitting the intermediary key to the counterpart client and the client; receiving the intermediary key from the client and obtaining an intermediary path corresponding to the intermediary key; receiving, from the client that does not receive an acknowledgement to data transmitted to the counterpart client due to a change of a network address of the counterpart client, the data through the intermediary path; and transmitting the data to the counterpart client when the counterpart client is re-accessed using the intermediary key.

The intermediary path may include a dedicated room of the client and the counterpart client that maintain the intermediary key.

The transmitting of the data to the counterpart client may include receiving a re-access request including the intermediary key from the counterpart client having the changed network address; and allowing an access in response to the re-access request based on the intermediary key.

The server operating method may further include receiving an address change notification from the counterpart client when the network address of the counterpart client is changed; and notifying the client of the change of the network address.

The intermediary key may correspond to a threshold or may be generated based on unique information of the client and the counterpart client.

The client may receive an acknowledgement to data received by the counterpart client and may transmit data to the changed network address of the counterpart client.

The server operating method may further include allocating a session identifier of the client to the client in response to receiving the P2P communication request of the client.

The server operating method may further include transmitting a randomly generated question to the client that is accessed prior to receiving the P2P communication request; receiving an answer from the client; and verifying whether the answer corresponds to the question.

The transmitting of the question may include transmitting, as the question, first encryption information that is generated by encrypting identification information received from the client and access time information of the client, the receiving of the answer may include receiving, as the answer, second encryption information that is generated by encrypting the first encryption information, and the verifying whether the answer corresponds to the question may include verifying whether extraction information that is acquired by decrypting the second encryption information corresponds to the identification information and the access time information.

According to an aspect, there is provided a method of operating a client, the method including transmitting a P2P communication request to a server; receiving, from the server, an intermediary key that is generated by a communication intermediary device that intermediates a communication between the client and a counterpart client and a network address of the counterpart client; connecting to the communication intermediary device using the intermediary key; transmitting data to the counterpart client using the network address; and transmitting the data to the communication intermediary device when an acknowledgement to data transmitted to the counterpart client is not received due to a change of the network address. The counterpart client accesses the communication intermediary device using the intermediary key and receives the data from the communication intermediary device.

An intermediary path corresponding to the intermediary key may be obtained in response to connection to the communication intermediary device.

The intermediary path may include a dedicated room of the client and the counterpart client that maintain the intermediary key.

The client operating method may further include receiving a notification about the change of the network address from the server.

The client operating method may further include receiving, from the counterpart client, an acknowledgement to data received by the counterpart client from the communication intermediary device.

The generating of the P2P communication path may include transmitting a speed test request to the counterpart client; receiving a test response to the speed test request from the counterpart client; and verifying a response time of the counterpart client based on the test response.

The transmitting of the data may include transmitting the data to the communication intermediary device when the acknowledgement is not received within the response time.

The client operating method may further include accessing the server prior to transmitting the P2P communication request and receiving a randomly generated question from the server; and transmitting an answer to the server.

The receiving of the question may include transmitting identification information of the client to the server; and receiving, as the question, first encryption information that is generated by encrypting the identification information and access time information of the client, and the transmitting of the answer may include transmitting, as the answer, second encryption information that is generated by encrypting the first encryption information.

According to another aspect, there is provided a method of operating a client, the method including accessing a communication intermediary device in response to receiving a P2P communication request of a request client from a server; receiving an intermediary key from the communication intermediary device; re-accessing the communication intermediary device using the intermediary key when a network address of the client is changed; receiving data from the communication intermediary device, the communication intermediary device receiving the data from the request client that does not receive an acknowledgement to data transmitted to the client; and transmitting an acknowledgement to the data to the request client.

According an aspect, there is provided a communication device including a controller configured to generate an intermediary key corresponding to a P2P communication between a client and a counterpart client and to obtain an intermediary path corresponding to the intermediary key; and a communicator configured to transmit the intermediary key to the counterpart client, to receive, from the client that does not receive an acknowledgement to data transmitted to the counterpart client due to a change of a network address of the counterpart client, the data through the intermediary path, and to transmit the data to the counterpart client when the counterpart client is accessed using the intermediary key.

According to an aspect, there is provided a client including a processor configured to transmit a P2P communication request to a server, to receive, from the server, an intermediary key that is generated by a communication intermediary device that intermediates a communication between the client and a counterpart client and a network address of the counterpart client, to connect to the communication intermediary device using the intermediary key, to transmit data to the counterpart client using the network address, and to transmit the data to the communication intermediary device when an acknowledgement to data transmitted to the counterpart client is not received due to a change of the network address. The counterpart client accesses the communication intermediary device using the intermediary key and receives the data from the communication intermediary device.

According to another aspect, there is provided a client including a connector configured to configured to access a communication intermediary device in response to receiving a P2P communication request of a request client from a server, to receive an intermediary key from the communication intermediary device, to re-access the communication intermediary device using the intermediary key when a network address of the client is changed, to receive data from the communication intermediary device, the communication intermediary device receiving the data from the request client that does not receive an acknowledgement to data transmitted to the client, and to transmit an acknowledgement to the data to the request client; and a processor configured to control the connector.

According to still another aspect, there is provided a method of operating a client, the method including establishing a P2P communication path with a counterpart client; transmitting a shared key to the counterpart client; receiving data encrypted using the shared key through the P2P communication path; decrypting the encrypted data using the shared key; and updating decryption count information associated with a data use amount of the client when the data is decrypted.

The client operating method may further include transmitting the updated decryption count information to a server; and receiving guide information associated with the data use amount from the server.

The guide information may include at least one of excess information indicating whether the data use amount exceeds a predetermined use amount; remaining information indicating an available data amount excluding the data use amount from the predetermined use amount; and limit information indicating whether at least one of a bandwidth and quality of P2P communication of the client is limited.

The client operating method may further include receiving information associated with a data use amount of a client that shares a data quota allocated to the client; and updating the decryption count information based on the received information.

The received information may include decryption count information that is updated every time encrypted data received by the client sharing the data quota through P2P communication is decrypted.

The client operating method may further include transmitting, to a server, change information indicating that a network address of the client is changed, when the network address of the client is changed; accessing a communication intermediary device that obtains an intermediary path corresponding to the P2P communication path; and receiving another data encrypted using the shared key of the counterpart client from the communication intermediary device. The counterpart client may transmit the other data to the communication intermediary device when an acknowledgement to the other data transmitted to the client is not received from the client.

The client operating method may further include updating the decryption count information when the other data is decrypted using the shared key.

The establishing of the P2P communication path may include transmitting a P2P communication request to a server; receiving, from the server, an intermediary key that is generated by a communication intermediary device that intermediates a communication between the client and the counterpart client and a network address of the counterpart client; accessing the communication intermediary device using the intermediary key; and establishing the P2P communication path with the counterpart client based on the network address in response to the access to the communication intermediary device.

The establishing of the P2P communication path may include receiving a P2P communication request of the counterpart client from a server; accessing a communication intermediary device that intermediates a communication between the client and the counterpart client in response to receiving the P2P communication request; receiving an intermediary key from the communication intermediary device and transmitting the intermediary key to the server; and receiving test data from the counterpart client and establishing the P2P communication path. The counterpart client may receive a network address of the client and the intermediary key from the server, may access the communication intermediary device using the intermediary key, and may transmit the test data to the client using the network address.

According to another aspect, there is provided a client including a communication interface configured to establish a P2P communication path with a counterpart client, to transmit a shared key to the counterpart client, and to receive data encrypted using the shared key through the P2P communication path; and a controller configured to decrypt the encrypted data using the shared key, and to update decryption count information associated with a data use amount of the client when the data is decrypted.

The communication interface may transmit the updated decryption count information to a server, and may receive guide information associated with the data use amount from the server.

The guide information may include at least one of excess information indicating whether the data use amount exceeds a predetermined use amount; remaining information indicating an available data amount excluding the data use amount from the predetermined use amount; and limit information indicating whether at least one of a bandwidth and quality of P2P communication of the client is limited.

The communication interface may receive information associated with a data use amount of a client that shares a data quota allocated to the client, and the controller may update the decryption count information based on the received information.

The received information may include decryption count information that is updated every time encrypted data received by the client sharing the data quota through P2P communication is decrypted.

The communication interface may transmit, to a server, change information indicating that a network address of the client is changed, when the network address of the client is changed, may access a communication intermediary device that obtains an intermediary path corresponding to the P2P communication path, and may receive another data encrypted using the shared key of the counterpart client from the communication intermediary device. The counterpart client may transmit the other data to the communication intermediary device when an acknowledgement to the other data transmitted to the client is not received from the client.

The controller may update the decryption count information when the other data is decrypted using the shared key.

The communication interface may transmit a P2P communication request to a server, may receive, from the server, an intermediary key that is generated by a communication intermediary device that intermediates a communication between the client and the counterpart client and a network address of the counterpart client, may access the communication intermediary device using the intermediary key, and may establish the P2P communication path with the counterpart client based on the network address in response to the access to the communication intermediary device.

The communication interface may receive a P2P communication request of the counterpart client from a server, may access a communication intermediary device that intermediates a communication between the client and the counterpart client in response to receiving the P2P communication request, may receive an intermediary key from the communication intermediary device and may transmit the intermediary key to the server, and may receive test data from the counterpart client and may establish the P2P communication path. The counterpart client may receive a network address of the client and the intermediary key from the server, may access the communication intermediary device using the intermediary key, and may transmit the test data to the client using the network address.

Effect

According to examples, although a peer-to-peer (P2P) communication path is disconnected, a client may perform communication through an intermediary path corresponding to the P2P communication path and a network throughput may be enhanced. Also, according to embodiments, in the case of providing a data based call or messaging service using P2P communication, billing may be performed for a data use amount of the P2P communication. Also, according to embodiments, billing based information may be generated using communication software.

BEST MODE FOR CARRYING OUT THE INVENTION

Figure 1A:
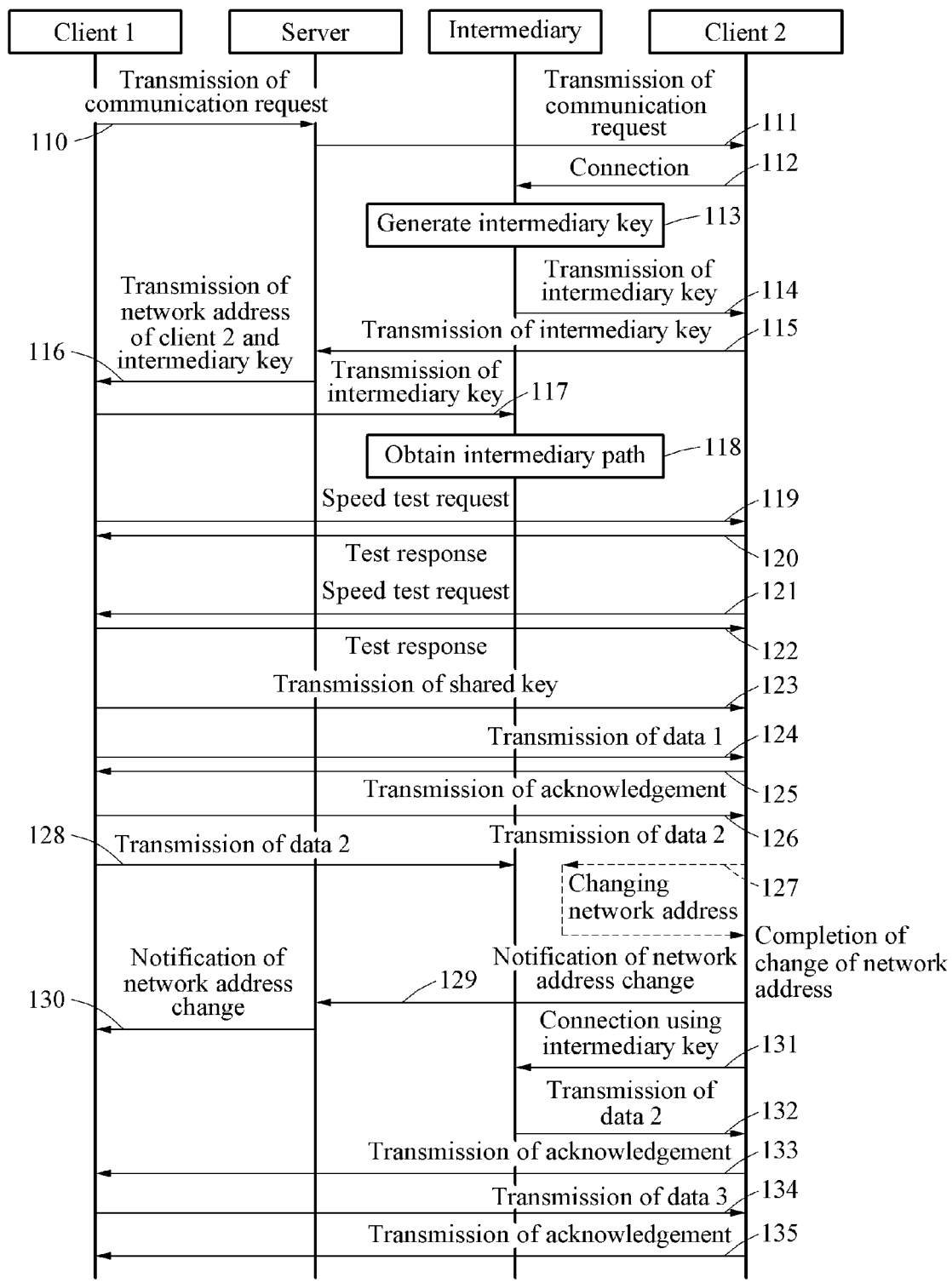
FIGS. 1A and 1B are flowcharts illustrating an example of an operation of a communication system according to an embodiment.

Hereinafter, embodiments will be described in detail with reference to the accompanying drawings.

Various alterations and modifications may be made to the embodiments. Here, the embodiments are not construed as being limited to the disclosure and should be understood to include all changes, equivalents, and replacements within the idea and the technical scope of the disclosure.

The terminology used herein is for the purpose of describing particular embodiments only and is not to be limiting of the embodiments. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. When it is determined detailed description related to a related known function or configuration they may make the purpose of the embodiments unnecessarily ambiguous in describing the embodiments, the detailed description will be omitted here.

Figure 1B:
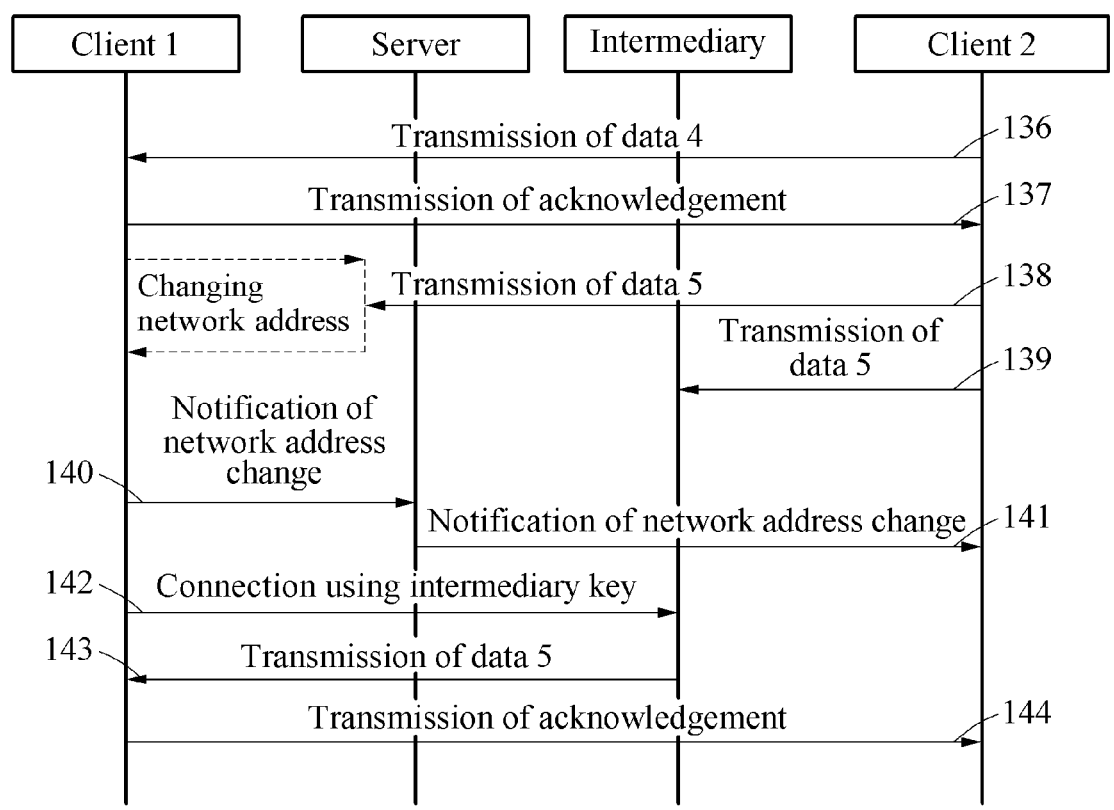

FIGS. 1A and 1B are flowcharts illustrating an example of an operation of a communication system according to an embodiment.

Referring to FIG. 1A, the communication system includes a client 1, a server, an intermediary, and a client 2.

Although not illustrated in FIG. 1A, the server may establish a communication session, for example, a user datagram protocol (UDP) session, with each of the client 1 and the client 2.

In operation 110, the client 1 transmits a communication request to the server. For example, to perform a peer-to-peer (P2P) communication with the server, the client 1 may transmit a P2P communication request to the server through the UDP session.

In operation 111, the server transmits the communication request of the client 1 to the client 2.

In response to receiving the communication request of the client 1, the client 2 may connect to the intermediary in operation 122. In detail, when the client 2 receives the communication request of the client 1 from the server, the client 2 may attempt to access the intermediary and the intermediary may allow the access of the client 2. Accordingly, the client 2 may connect to the intermediary and maintain the access.

According to an embodiment, the intermediary may be an independent device on a network as a device physically separate from the server. Also, depending on embodiments, the intermediary may be included in the server and may be one of a plurality of units logically separate in the server.

Once the intermediary is connected to the client 2, the intermediary generates an intermediary key in operation 113. For example, the intermediary may generate an intermediary key having a random value. Also, the intermediary may generate the intermediary key based on unique information of the client 1 and/or the client 2. The unique information may include, for example, an identifier allocated to each of the client 1 and the client 2.

In operation 114, the intermediary transmits the intermediary key to the client 2.

In operation 115, the client 2 transmits the intermediary key to the server.

In operation 116, the server transmits a network address of the client 2 and the intermediary key to the client 1. The network address may include, for example, an Internet protocol (IP) address.

In operation 117, the client 1 transmits the intermediary key to the intermediary. The client 1 may access the intermediary by transmitting the intermediary key to the intermediary. Also, the client 1 may maintain the access to the intermediary.

In operation 118, the intermediary obtains an intermediary path when the intermediary key is received from the client 1. In the example of FIG. 1A, an intermediary path corresponding to a connection relationship of client 1-intermediary-client 2 may be formed. The intermediary path is a path for coping with disconnection of a P2P communication path between the client 1 and the client 2. In one embodiment, the intermediary path may include a dedicated room of the client 1 and the client 2 that maintain the intermediary key. Obtaining the intermediary path may indicate that a dedicated room is generated in the intermediary. When the intermediary receives the intermediary key from the client 1, the intermediary may generate the dedicated room in which the client 1 and the client 2 may participate and other clients may not participate.

In operation 119, the client 1 may transmit a speed test request to the client 2 through the network address. When the client 1 accesses the intermediary or when the intermediary path is obtained, the client 1 may transmit test data for testing a P2P communication speed to the client 2.

In operation 120, the client 2 may transmit a test response to the speed test request to the client 1. The client 1 may verify a response time of the client 2. The client 1 may verify the P2P communication speed between the client 1 and the client 2.

In operation 121, the client 2 may transmit a speed test request to the client 1. In operation 122, the client 1 may transmit a test response to the speed test request to the client 2. The client 2 may verify a response time of the client 1.

A speed test of the client 2 and a speed test of the client 1 may be simultaneously performed.

According to an embodiment, the speed test of the client 1 and/or the client 2 may be repeated a predetermined number of times. For example, the speed test may be repeated twice, or twice or more. Once the test response is received from the client 2, the client 1 may transmit an additional speed test request to the client 2. The client 2 may transmit a test response to the additional speed test request to the client 1. The client 1 may verify an average response time of the client 2 based on the repeated speed tests. Likewise, the client 2 may verify an average response time of the client 1 based on the repeated speed tests.

The P2P communication path may be established between the client 1 and the client 2. When it is assumed that the client 1 is mapped to a network address A and the client 2 is mapped to a network address B, P2P communication path A-B may be established.

In operation 123, the client 1 transmits a shared key to the client 2. The shared key is used for encryption and/or decryption of data. The shared key may be transmitted through the P2P communication path.

In the example of FIG. 1A, the client 1 transmits the shared key to the client 2 after the speed test is terminated. However, it is provided as an example only and the client 1 may simultaneously transmit the speed test request and the shared key to the client 2. When the client 1 does not receive the test response from the client 2, the client 1 may simultaneously retransmit the speed test request and the shared key to the client 2. Once the test response is received from the client 2, the client 1 does not transmit the shared key when transmitting an additional speed test request to the client 2.

Also, in the example of FIG. 1A, the client 1 transmits the shared key to the client 2 through the P2P communication path. However, it is provided as an example only. The client 1 may access the server and then transmit the shared key to the server, and the server may transmit the shared key to the client 2. For example, the client 1 may simultaneously transmit the communication request and the shared key to the server, and the server may simultaneously transmit the communication request and the shared key to the client 2.

In operation 124, the client 1 transmits data 1 to the client 2. Here, the data 1 may be encrypted with the shared key. The data 1 may be a data fragment of the entire data.

The client 2 receives the data 1 and decrypts the data 1 using the shared key. Although not illustrated in FIG. 1A, when the data 1 is decrypted, the client 2 updates decryption count information. Here, it is assumed that decryption count information$_{client\ 2}$ recorded before the client 2 receives the data 1 is n. When the data 1 is decrypted, the client 2 may update the decryption count information$_{client\ 2}$ with n+1. In operation 125, the client 2 may transmit an acknowledgement to the data 1 to the client 1.

In operation 126, the client 1 may transmit data 2 to the client 2 in response to receiving the acknowledgement to the data 1. The data 2 may be a data fragment of the entire data and may be encrypted using the shared key.

In one embodiment, it is assumed that the network address of the client 2 is being changed due to movement of the client 2 in operation 136. When the network address of the client 2 is being changed, the client 1 may receive an acknowledgement to the data 2 from the client 2 later than a response time (or an average response time) or may not receive the same. In this case, the client 1 transmits the data 2 to the intermediary in operation 128. When the client 1 does not receive the acknowledgement to the data 2 within the response time verified in the speed test operation, the client 1 may transmit the data 2 to the intermediary. That is, since the client 1 maintains the access to the intermediary from before the P2P communication, the client 1 may detect an event regarding that the acknowledgement is not received during a predetermined period of time. In this case, the client 1 may transmit the data 2 to the intermediary. The client 1 may transmit the data 2 to the intermediary through the intermediary path.

Once the data 2 is received from the client 1, the intermediary stores the data 2 in a memory. The memory may include, for example, a memory corresponding to the intermediary path or the dedicated room.

In operation 129, the client 2 may notify the server of a change of the network address when the change of the network address is completed. When the network address of the client 2 is changed from B to B', the client 2 may notify the server of the change of the network address from B to B'. That is, the server may receive, from the client 2, change information indicating that the network address is changed. Here, the change information may include the changed network address of the client 2. Accordingly, the server may verify the changed network address of the client 2.

According to an embodiment, the server may perform a question-and-answer process with the client 2 to verify whether a network entity mapped to B' is the client 2. The question-and-answer process will be described with reference to FIG. 9.

Also, when the network address of the client 2 is changed, it may be difficult to maintain the communication session with the server that is established before the network address of the client 2 is changed. According to an embodiment, the server may maintain the communication session with the client 2 through the question-and-answer process.

An operation of verifying the network entity mapped to the changed network address and maintaining the communication session will be described with reference to FIG. 9.

In operation 130, the server may notify the client 1 of the change of the network address of the client 2. That is, the client 1 may receive change information of the network address from the server. Accordingly, the client 1 may verify the changed network address of the client 2.

In operation 131, the client 2 of which the network address is mapped to B' connects to the intermediary using the intermediary key. That is, the client 2 may attempt to access the intermediary by transmitting the intermediary key to the intermediary, and the intermediary may allow the access of the client 2. Accordingly, the client 2 may access the intermediary. Once the client 2 is connected to the intermediary, the intermediary may transmit the data 2 to the client 2 in operation 132. For example, the client 2 may participate in the dedicated room using the intermediary key. When the client 2 participates in the dedicated room, the client 2 may receive the data 2 that is stored in the memory corresponding to the dedicated room.

When the data 2 is received, the client 2 may decrypt the data 2 using a public key. Also, the client 2 may update decryption count information. In the above example, the client 2 may update the decryption count information$_{client\ 2}$ with n+2. In operation 133, the client 2 may transmit an acknowledgement to the data 2 to the client 1.

In operation 134, the client 1 may transmit data 3 to the client 2 in response to receiving the acknowledgement to the data 2. The P2P communication path is changed from A-B to A-B'.

The data 3 may be encrypted using the shared key.

The client 2 may receive the data 3 and may decrypt the data 3 using the shared key. The client 2 may update the decryption count information. In the above example, the client 2 may update the decryption count information$_{client\ 2}$ with n+3. In operation 135, the client 2 may transmit an acknowledgement to the data 3 to the client 1.

Referring to FIG. 1B, in operation 136, the client 2 transmits data 4 to the client 1. The data 4 may be encrypted using the shared key.

The client 1 may receive the data 4 and may decrypt the data 4 using the shared key. Also, the client 1 may update decryption count information of the client 1. Here, it is assumed that decryption count information$_{client\ 1}$ recorded before the client 1 receives the data 4 is m. When the data 4 is decrypted, the client 1 may update the decryption count information$_{client\ 1}$ with m+1.

In operation 137, the client 1 may transmit an acknowledgement to the data 4 to the client 2.

In operation 138, the client 2 may transmit data 5 to the client 1. Here, a network address of the client 1 may be changed due to movement. Accordingly, the client 2 may not receive an acknowledgement to the data 5 within a predetermined period of time. In this case, in operation 139, the client 2 may transmit the data 5 to the intermediary.

In operation 140, the client 1 may notify the server of the change of the network address. In operation 141, the server may notify the client 2 of the change of the network address of the client 1. Here, it is assumed that the network address of the client 1 is changed from A to A'.

In operation 142, the client 1 may connect to the intermediary using the intermediary key. In detail, the client 1 may attempt to access the intermediary by transmitting the intermediary key to the intermediary. The intermediary may allow the access of the client 1.

In operation 143, the intermediary may transmit the data 5 to the client 1 when the intermediary is connected to the client 1 that is mapped to the changed network address.

The client 1 may receive the data 5. Here, the data 5 may be encrypted using the shared key. The client 1 may decrypt the data 5 using the shared key and may update the decryption count information. In the above example, the decryption count information$_{client\ 1}$ may be updated with m+2.

In operation 144, the client 1 may transmit the acknowledgement to the data 5 to the client 2.

In the example of FIGS. 1A and 1B, the data 1 to the data 3 is not transmitted to the client 2 through exchanger equipment, for example, equipment for determining a quality of service (QoS) or a service level agreement (SLA) of a mobile communication provider. Likewise, the data 4 and the data 5 is not transmitted to the client 1 through the exchanger equipment of the mobile communication provider. In this case, billing for the data 1 to the data 5 may be difficult. Accordingly, as described above, each of the client 1 and the client 2 may update decryption count information every time received data is decrypted. The decryption count information is information that is used as a base to perform billing as information associated with a data use amount. Each of the client 1 and the client 2 may transmit the decryption count information to the server at predetermined periods to perform billing for the data use amount. For example, each of the client 1 and the client 2 may transmit decryption count information to the server once a day, once a week, or once a month. Also, when the P2P communication is terminated, each of the client 1 and the client 2 may transmit the decryption count information to the server.

Each of the client 1 and the client 2 may encrypt the decryption count information and may transmit the encrypted decryption count information to the server.

According to an embodiment, the server may determine a data use amount of each of the client 1 and the client 2 based on the decryption count information, and may transmit the data use amount of each of the client 1 and the client 2 to a billing system. The billing system may generate billing information and may transmit the billing information to the server. According to another embodiment, the server may generate billing information based on decryption count information.

Since decryption count information associated with the data use amount of P2P communication of each of the client 1 and the client 2 may be transmitted to the server, billing for the data use amount of P2P communication of each of the client 1 and the client 2 may be performed.

Figure 2:
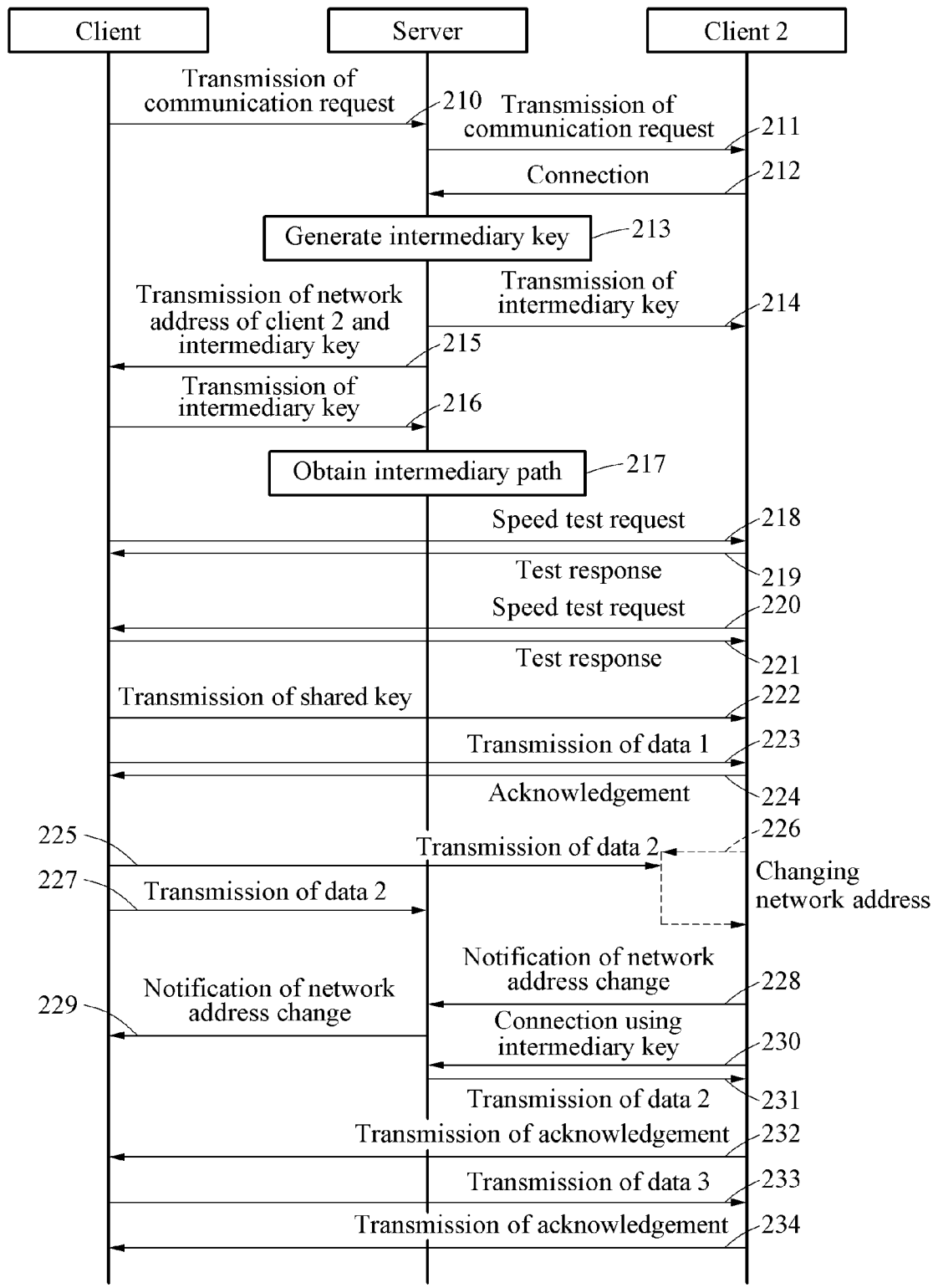
FIG. 2 is a flowchart illustrating another example of an operation of a communication system according to an embodiment.

FIG. 2 is a flowchart illustrating another example of an operation of a communication system according to an embodiment.

Referring to FIG. 2, the communication system includes a client 1, a server, and a client 2. The intermediary of FIG. 1 may be included in the server.

In operation 210, the client 1 may transmit a communication request to the server. For example, the communication request may be a P2P communication request. In operation 211, the server may transmit the communication request of the client 1 to the client 2.

In operation 212, in response to receiving the communication request of the client 1, the client 2 may connect to the server. That is, the client 2 may access the server.

In operation 213, the server may generate an intermediary key once the client 2 accesses the server. In operation 214, the server may transmit the intermediary key to the client 2.

In operation 215, the server may transmit the intermediary key and a network address of the client 2 to the client 1. Here, it is assumed that a network address of the client 1 is A and the network address of the client 2 is B.

In operation 216, the client 1 may transmit the intermediary key to the server. In operation 217, the server that receives the intermediary key may obtain an intermediary path corresponding to the intermediary key.

In operation 218, the client 1 may transmit a speed test request to the client 2 when the intermediary path is obtained. In operation 219, the client 2 may transmit a test response to the speed test request to the client 1. Likewise, in operation 220, the client 2 may transmit a speed test request to the client 1. In operation 221, the client 1 may transmit a test response to the speed test request to the client 2.

A P2P communication path may be established between the client 1 and the client 2.

In operation 222, the client 1 transmits a shared key to the client 2.

In operation 223, the client 1 may encrypt data 1 using the shared key and may transmit the encrypted data 1 to the client 2. The client 2 receives the encrypted data 1 and decrypts the encrypted data 1 using the shared key. The client 2 updates decryption count information. In operation 224, the client 2 may transmit an acknowledgement to the client 1.

In operation 225, the client 1 may encrypt data 2 using the shared key and may transmit the encrypted data 2 to the client 2 in response to receiving the acknowledgement to the data 1. Here, when a network address of the client 2 is being changed in operation 235, a response speed of the client 2 may be later than a response speed verified from a response test. Alternatively, a response of the client 2 may be absent.

The client 1 may receive an acknowledgement to the encrypted data 2 from the client 2 later than the response speed verified from the response test or may not receive the acknowledgement. In this case, in operation 227, the client 1 may transmit the encrypted data 2 to the server through the intermediary path. The server may store the encrypted data 2 in a memory corresponding to a dedicated room or the intermediary path.

In operation 228, the client 2 may notify the server of a change of the network address when the network address of the client 2 is changed from B to B'. In operation 229, the server may notify the client 1 of the change of the network address of the client 2.

In operation 230, the client 2 may be connected to the server using the intermediary key since the client 2 maintains the intermediary key. In operation 231, the server may transmit the encrypted data 2 to the client 2. The client 2 may receive the encrypted data 2 and may decrypt the encrypted data 2 using the shared key. Also, the client 2 may update decryption count information.

In operation 232, the client 2 may transmit an acknowledgement to the data 2 to the client 1.

In operation 233, the client 1 may transmit data 3 encrypted using the shared key to the client 2 in response to receiving the acknowledgement to the data 2. P2P communication is initiated through the P2P communication path A-B'. When the data 3 is received, the client 2 may decrypt the data 3 using the shared key and may update the decryption count information. In operation 234, the client 2 may transmit an acknowledgement to the data 3 to the client 1.

Although not illustrated in FIG. 2, the client 2 may transmit data encrypted using the shared key to the client 1, and the client 1 may decrypt the encrypted data using the shared key. The client 1 may update decryption count information.

The description made above with reference to FIGS. 1A and 1B may be applicable to the embodiment of FIG. 2 and thus, a further description is omitted here.

Figure 3A:
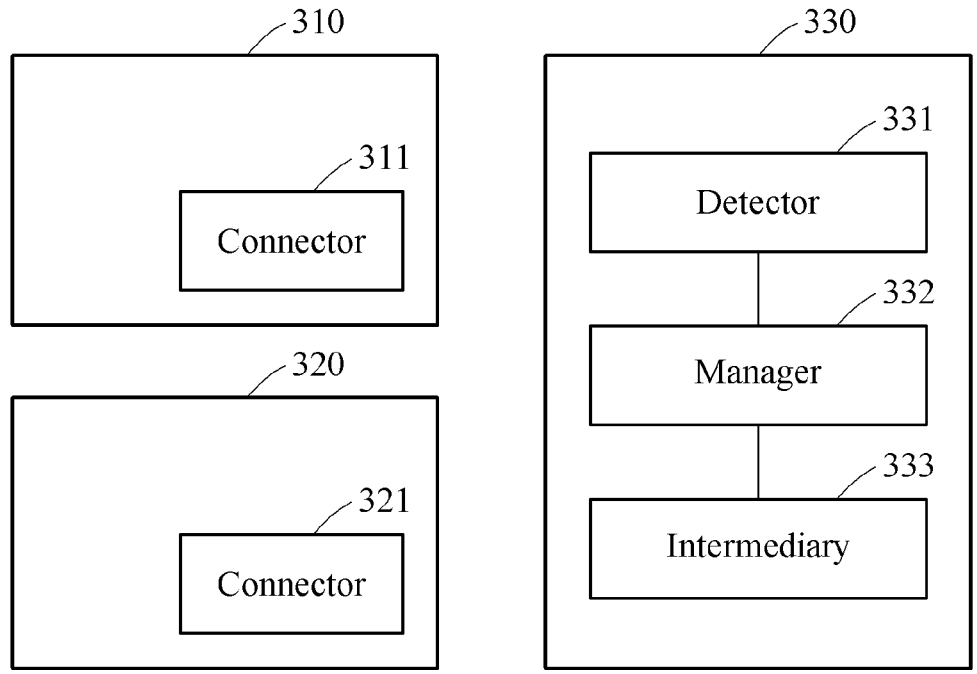
FIGS. 3A and 3B are block diagrams illustrating a communication system according to an embodiment.
Figure 3B:
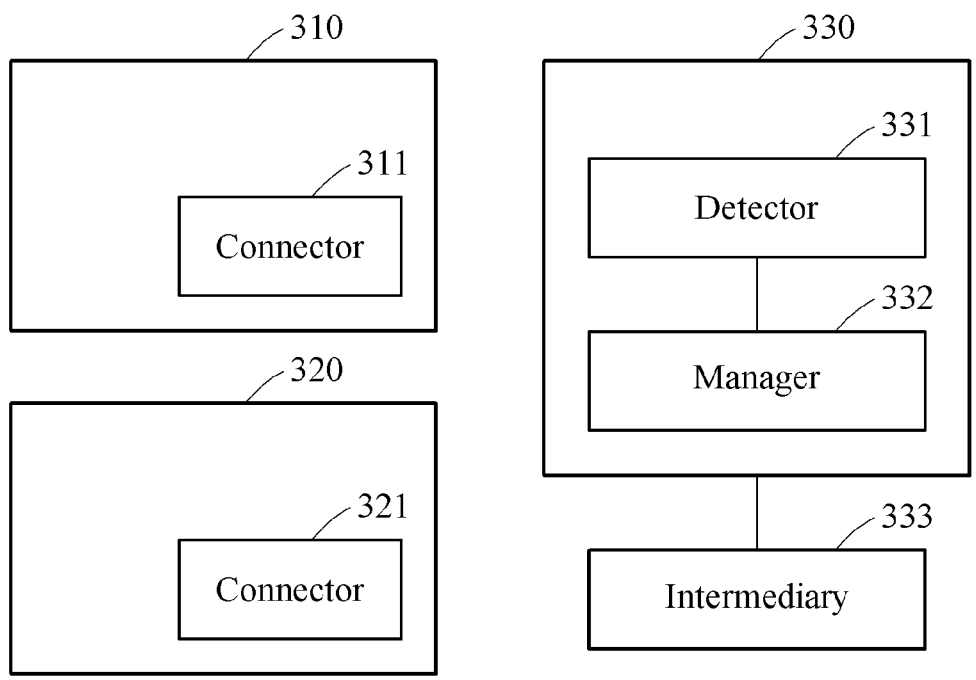

FIGS. 3A and 3B are block diagrams illustrating a communication system according to an embodiment.

Referring to FIG. 3A, a client 310 includes a connector 311 and a client 320 includes a connector 321. A server 330 includes a detector 331, a manager 332, and an intermediary 333.

Each of the connector 311 and the connector 321 may include a communication interface capable of performing a P2P communication.

The client 310 may include a processor (not shown) and a memory (not shown).

The processor may control the connector 311, and the memory may store an intermediary key. Depending on embodiments, intermediary key may be stored in a security call dongle, which is described below.

The client 320 may further include a processor (not shown) and a memory (not shown). The processor may control the connector 321 and the memory may store an intermediary key. Depending on embodiments, the intermediary key may be stored in a security call dongle, which is described below.

The detector 331, the manager 332, and the intermediary 333 may be configured by the processor or a controller.

The connector 311 may transmit a P2P communication request to the server 330, and the server 330 may transmit the P2P communication request to the connector 321. In response to receiving the P2P communication request, the connector 321 may access the intermediary 333. Once the intermediary 333 accesses the connector 321, the intermediary 333 may generate an intermediary key. The intermediary 333 may transmit the intermediary key to the connector 321. Here, the connector 321 may maintain the access to the intermediary 333.

The connector 321 may transmit the intermediary key to the manager 332, and the manager 332 may transmit the intermediary key and a network address of the counterpart client 330 to the connector 311. The connector 311 may transmit the intermediary key to the intermediary 333 and may access the intermediary 333 using the intermediary key. Here, the connector 311 may maintain the access to the intermediary 333.

Since each of the connector 311 and the connector 321 may maintain the access to the intermediary 333, an intermediary path or a detour path having a connection relationship of connector 311-intermediary 333-connector 321 may be obtained. The intermediary path is a direct path between the connector 311 and the connector 321, that is, a path for coping with disconnection of a P2P communication path. Also, since the intermediary path corresponds to the intermediary key, the client 310 and the client 320 maintaining the intermediary key may use the intermediary path and other clients may not use the intermediary path.

Once the intermediary path is obtained, the connector 311 and the connector 321 may be connected through the direct path. For example, when a network address of the client 310 is A and a network address of the client 320 is B, the connector 311 and the connector 321 may be connected to each other through a P2P communication path A-B.

The client 310 and the client 320 may share a shared key.

The client 310 may receive data encrypted using the shared key from the client 320 and may decrypt the encrypted data using the shared key. Every time decryption is performed, the client 310 may update decryption count information. Likewise, the client 320 may receive data encrypted using the shared key from the client 310 and may decrypt the encrypted data using the shared key. Every time decryption is performed, the client 320 may update decryption count information.

The decryption count information of the client 310 may be encrypted and recorded in the memory and/or a security call dongle, which is described blow. Likewise, the decryption count information of the client 320 may be encrypted and recorded in the memory and/or the security call dongle.

According to an embodiment, the network address of the client 320 may be being changed. In this case, the P2P communication path A-B may be disconnected and the connector 321 may not receive data transmitted from the connector 311. The data may be missed. Accordingly, the connector 311 may not receive an acknowledgement to the data. The connector 311 may transmit the data to the intermediary 333.

When the network address of the client 320 is changed from B to B', the connector 321 may notify the detector 331 of the change of the network address of the client 320. The detector 331 may notify the manager 332 of the change of the network address of the client 320 and the manager 332 may notify the connector 311 of the change of the network address of the client 320.

Due to the change of the network address of the client 320, the access of the connector 321 to the intermediary 333 may be disconnected. The connector 321 may attempt to re-access the intermediary 333 by transmitting the intermediary key to the intermediary 333. The intermediary 333 may receive the intermediary key corresponding to the client 320 and may allow the re-access. When the connector 321 re-accesses the intermediary 333, the connector 321 may receive the data from the intermediary 333.

The connector 321 may transmit an acknowledgement to the data to the connector 311.

The description made above with reference to FIGS. 1A through 2 may be applicable to the embodiment of FIG. 3A and thus, a further description is omitted.

Referring to FIG. 3B, the intermediary 333 may be physically separate from the server 330. Also, the intermediary 333 may be an independent device within a network.

The description made above with reference to FIGS. 1 through 3A may be applicable to the embodiment of FIG. 3B and thus, a further description is omitted here.

Figure 4:
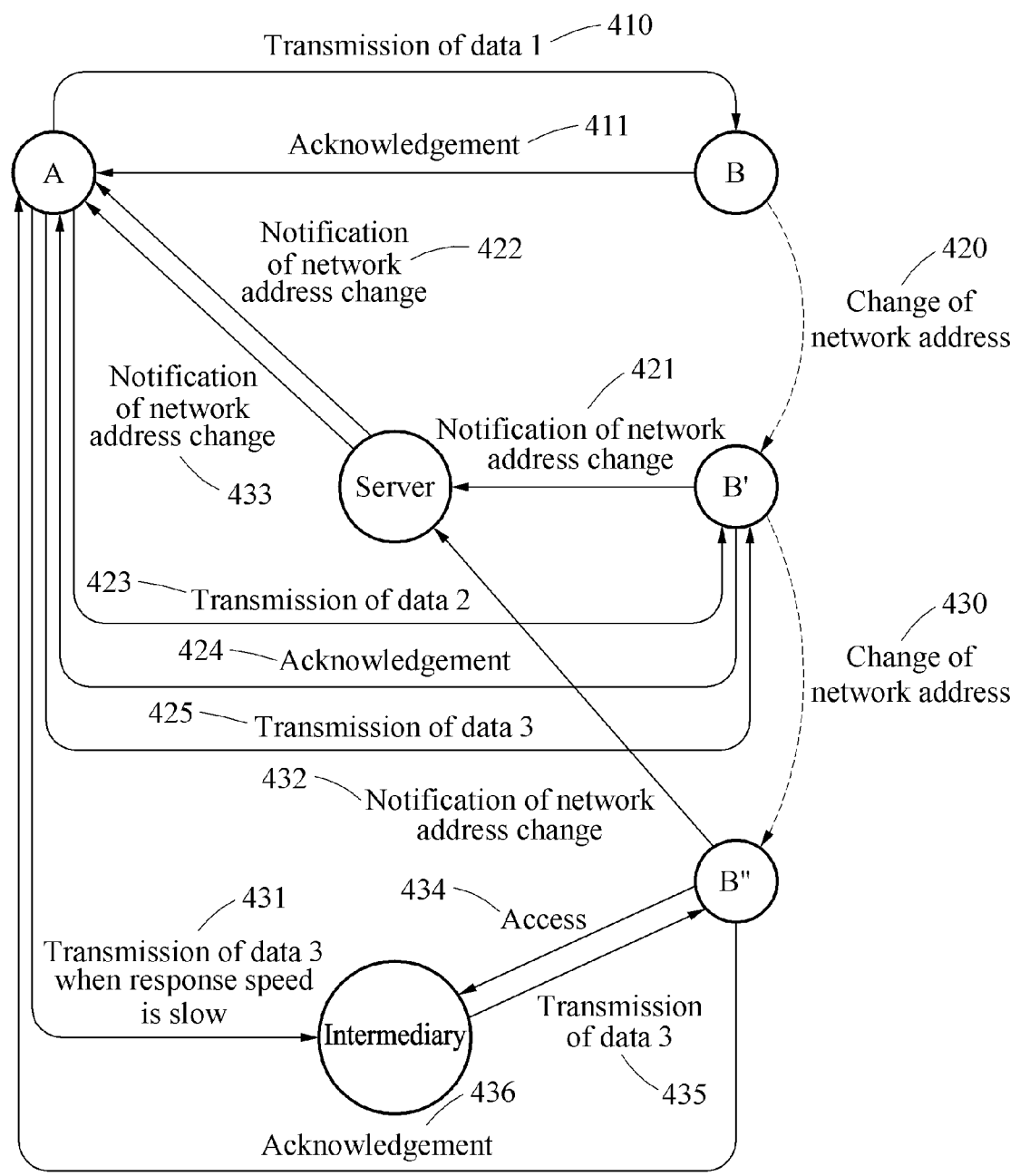
FIG. 4 illustrates an example of describing an operation of a communication system according to an embodiment.

FIG. 4 illustrates an example of describing an operation of a communication system according to an embodiment.

Referring to FIG. 4, a client is mapped to a network address A, and a counterpart client is mapped to a network address B. The client and the counterpart client communicate through a P2P communication path A-B.

In operation 410, the client may transmit data 1 to the counterpart client. In operation 411, the counterpart client may transmit an acknowledgement to the data 1 to the client.

In operation 420, a network address of the counterpart client may be changed from B to B'. In operation 421, the counterpart client may notify a server of the change of the network address of the counterpart client. In operation 422, the server may notify the client of the change of the network address of the counterpart client. In operation 423, the client may transmit data 2 to the counterpart client that is mapped to the network address B'. That is, the client may transmit the data 2 to the counterpart client through a P2P communication path A-B'. In operation 424, the counterpart client may transmit an acknowledgement to the data 2 to the client. In operation 425, the client that receives the acknowledgement to the data 2 may transmit data 3 to the counterpart client.

In operation 430, the network address of the counterpart client may be changed from B' to B". In this case, the client may not receive an acknowledgement to the data 3 from the counterpart client or may receive the acknowledgement later. When a response speed of the counterpart client is slow, the client may transmit the data 3 to an intermediary in operation 431. In operation 432, the counterpart client may notify the server of the change of the network address. In operation 433, the server may notify the client of the change of the network address of the counterpart client.

Since the counterpart client maintains the intermediary key, the counterpart client may access the intermediary using the intermediary key in operation 434. When the counterpart client accesses the intermediary, the intermediary may transmit the data 3 to the counterpart client in operation 435. In operation 436, the counterpart client may transmit the acknowledgement to the data 3 to the client. The client may transmit the data to the counterpart client through a P2P communication path A-B".

When an IP address of a client 2 is changed, a P2P communication path is disconnected and a client 1 and the client 2 may not continuously maintain P2P communication. According to an embodiment, since an intermediary path is obtained before the P2P communication, the client 1 and the client 2 may transmit and receive data to and from an intermediary through temporary communication with the intermediary, regardless of disconnection of the P2P communication path. Accordingly, it is possible to prevent mission of data. Also, it is possible to enhance a network throughput.

The description made above with reference to FIGS. 1A through 3B may be applicable to the embodiment of FIG. 4 and thus, a further description is omitted here.

Figure 5:
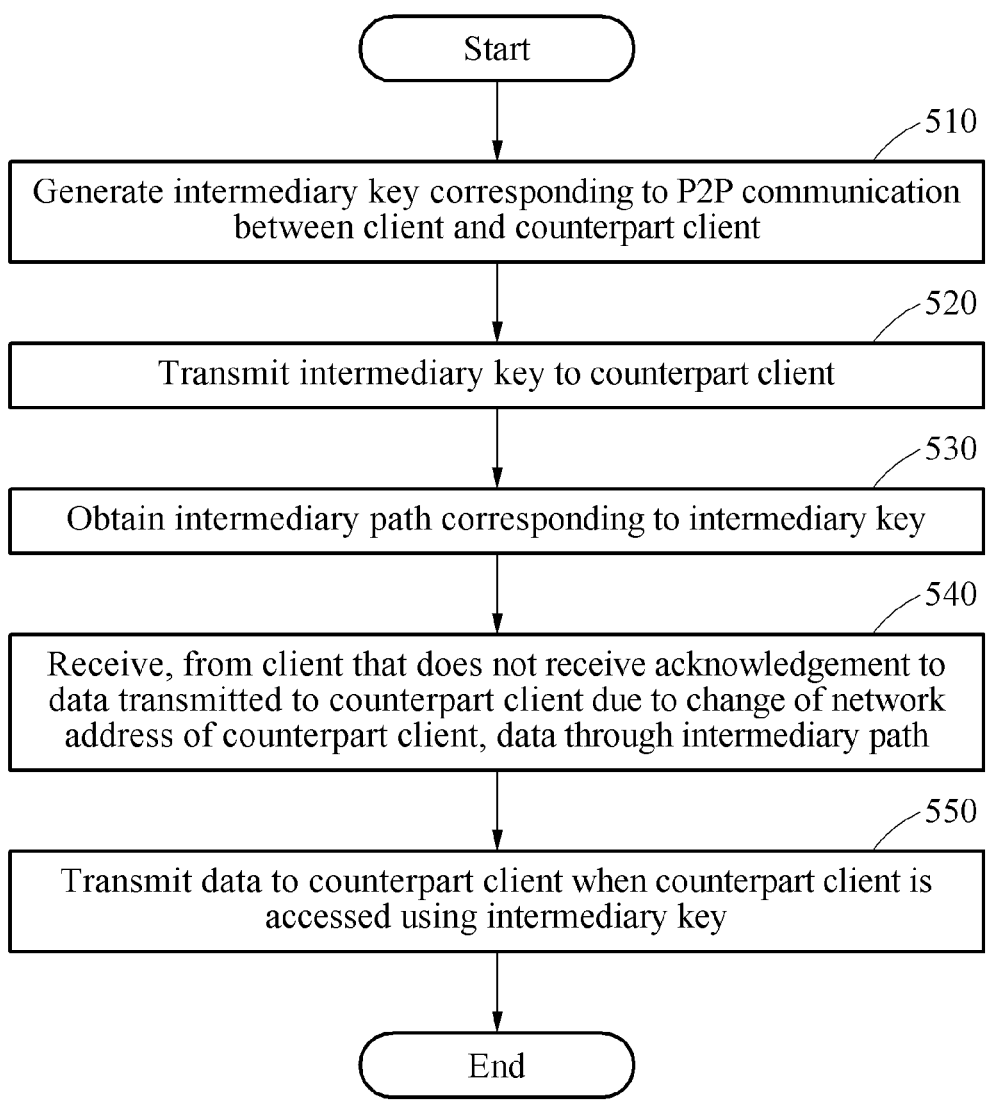
FIG. 5 is a flowchart illustrating a method of operating a communication device according to an embodiment.

FIG. 5 is a flowchart illustrating a method of operating a communication device according to an embodiment.

The communication device of FIG. 5 may correspond to the aforementioned intermediary.

Referring to FIG. 5, in operation 510, the communication device generates an intermediary key corresponding to a P2P communication between a client and a counterpart client.

In operation 520, the communication device transmits the intermediary key to the counterpart client.

In operation 530, the communication device obtains an intermediary path corresponding to the intermediary key.

In operation 540, the communication device receives, from the client that does not receive an acknowledgement to the data transmitted to the counterpart client due to a change of a network address of the counterpart client, the data through the intermediary path. That is, although the client transmits data to the counterpart client, the client may not receive an acknowledgement to the data from the counterpart client due to the change of the network address of the counterpart client. In this case, the client may transmit the data to the communication device.

In operation 550, the communication device may transmit the data to the counterpart client when the counterpart client is accessed with the changed network address using the intermediary key.

The description made above with reference to FIGS. 1A through 4 may be applicable to the embodiment of FIG. 5 and thus, a further description is omitted here.

Figure 6:
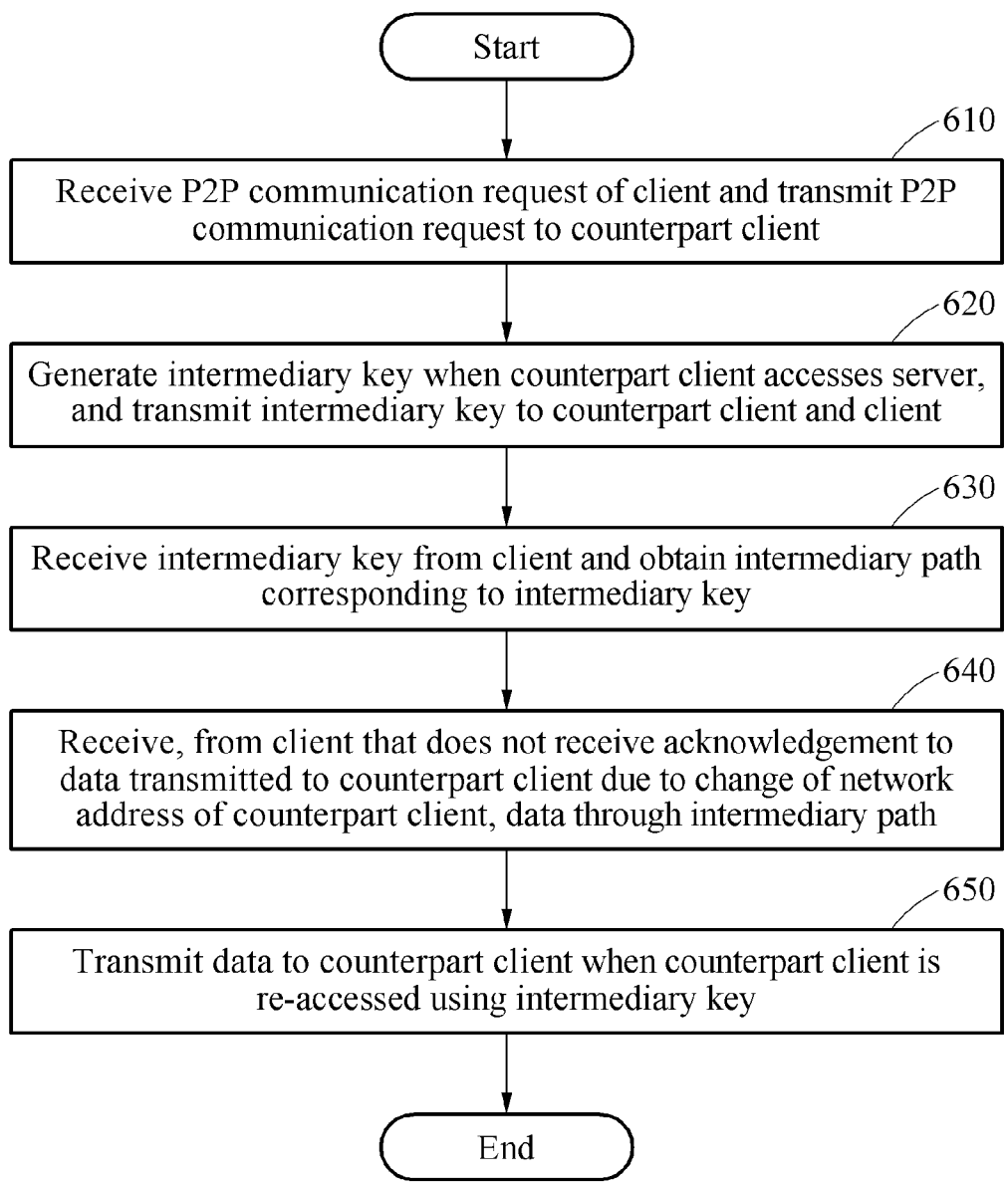
FIG. 6 is a flowchart illustrating a method of operating a server according to an embodiment.

FIG. 6 is a flowchart illustrating a method of operating a server according to an embodiment.

Referring to FIG. 6, in operation 610, the server receives a P2P communication request of a client and transmits the P2P communication request to a counterpart client.

In operation 620, the server generates an intermediary key when the counterpart client accesses the server, and transmits the intermediary key to the counterpart client and the client.

In operation 630, the server receives the intermediary key from the client and obtains an intermediary path corresponding to the intermediary key.

In operation 640, the server receives, from the client that does not receive an acknowledgement to data transmitted to the counterpart client due to a change of a network address of the counterpart client, the data through the intermediary path.

In operation 650, the server transmits the data to the counterpart client when the counterpart client is re-accessed with the changed network address using the intermediary key.

The description made above with reference to FIGS. 1A through 4 may be applicable to the embodiment of FIG. 6 and thus, a further description is omitted here.

Figure 7:
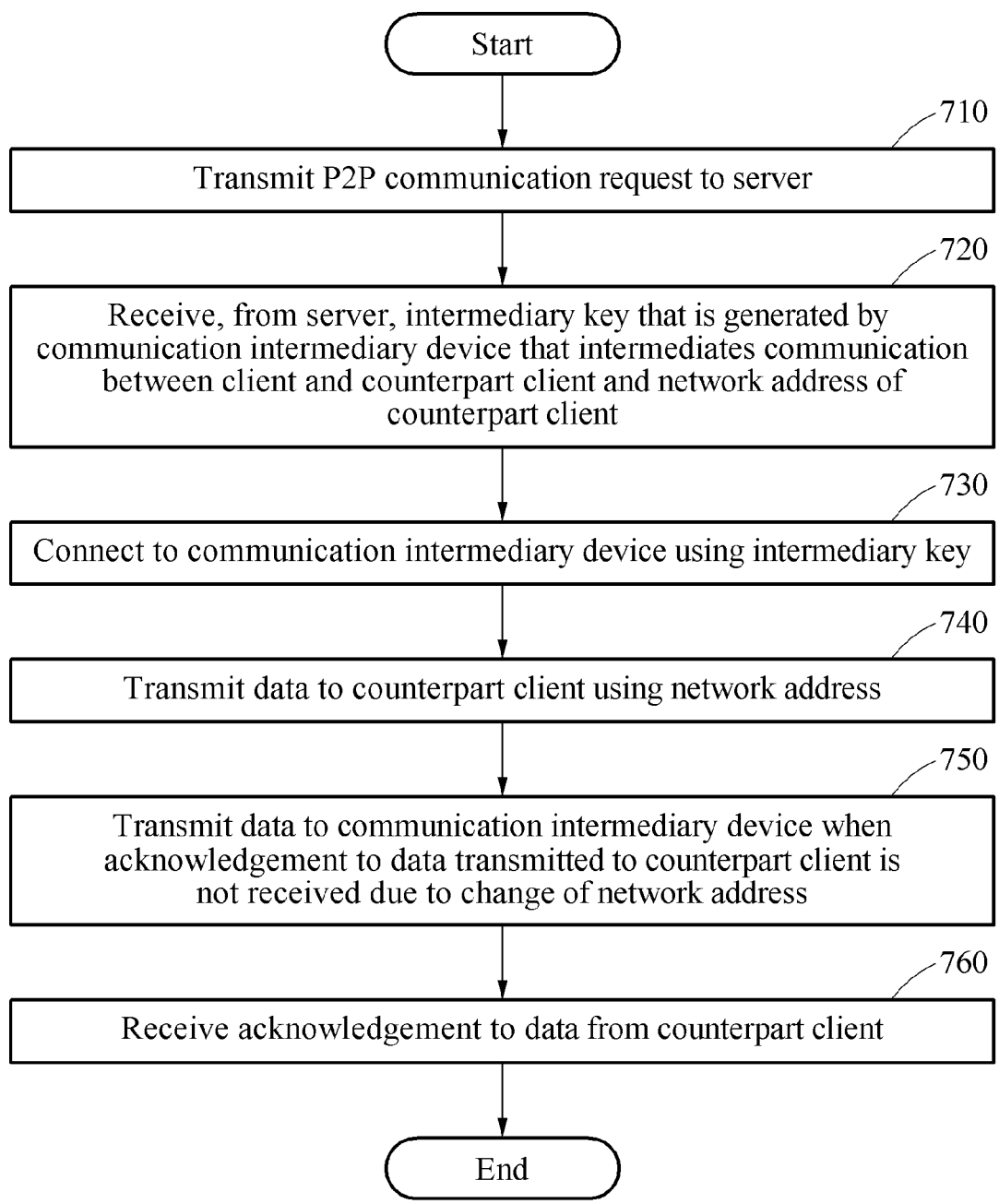
FIG. 7 is a flowchart illustrating an example of a method of operating a client according to an embodiment.

FIG. 7 is a flowchart illustrating an example of a method of operating a client according to an embodiment.

Referring to FIG. 7, in operation 710, the client transmits a P2P communication request to a server.

In operation 720, the client receives, from the server, an intermediary key that is generated by a communication intermediary device that intermediates a communication between the client and a counterpart client and a network address of the counterpart client. The communication intermediary device may correspond to the aforementioned intermediary.

In operation 730, the client connects to the communication intermediary device using the intermediary key.

In operation 740, the client transmits data to the counterpart client using the network address.

In operation 750, the client transmits the data to the communication intermediary device when an acknowledgement to data transmitted to the counterpart client is not received due to a change of the network address. The counterpart client accesses the communication intermediary device using the changed network address and the intermediary key, and receives data from the communication intermediary device.

In operation 760, the client receives an acknowledgement to the data from the counterpart client.

The description made above with reference to FIGS. 1A through 4 may be applicable to the embodiment of FIG. 7 and thus, a further description is omitted here.

Figure 8:
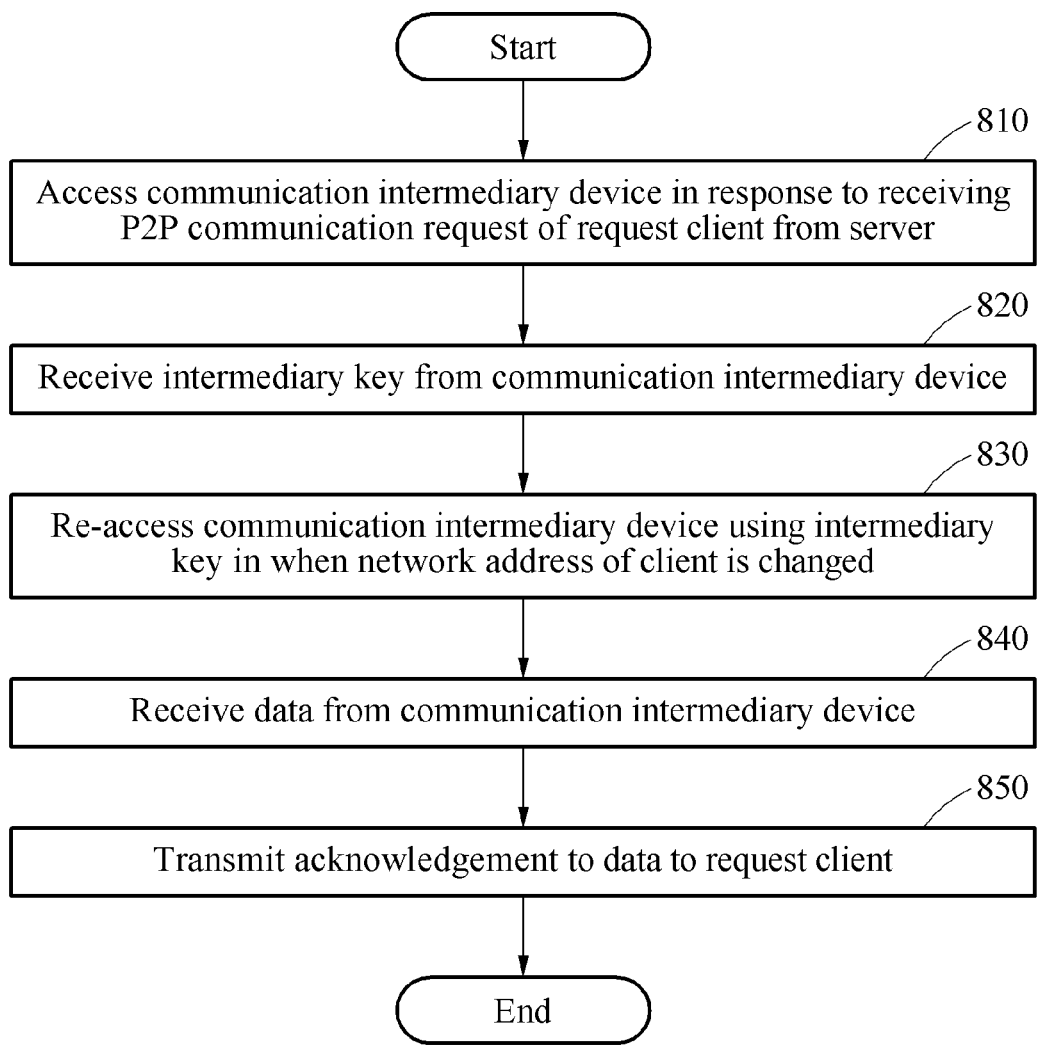
FIG. 8 is a flowchart illustrating another example of a method of operating a client according to an embodiment.

FIG. 8 is a flowchart illustrating another example of a method of operating a client according to an embodiment.

FIG. 8 is a flowchart illustrating another example of a method of operating a client according to an embodiment.

The client of FIG. 8 may correspond to the client 2 described with FIGS. 1A through 2.

Referring to FIG. 8, in operation 810, the client accesses a communication intermediary device in response to receiving a P2P communication request of a request client from a server. Here, the request client may correspond to the client 1 described with FIGS. 1A through 2.

In operation 820, the client receives an intermediary key from the communication intermediary device. The communication intermediary device may correspond to the aforementioned intermediary.

In operation 830, the client re-accesses the communication intermediary device using the intermediary key when a network address of the client is changed.

When the network address of the client is changed, the request client does not receive an acknowledgement to the data transmitted to the client. In this case, the request client transmits the data to the communication intermediary device. The communication intermediary device stores the data.

In operation 840, the client receives the data from the communication intermediary device.

In operation 850, the client transmits the acknowledgement to the data to the request client.

The description made above with reference to FIGS. 1A through 4 may be applicable to the embodiment of FIG. 8 and thus, a further description is omitted here.

Figure 9:
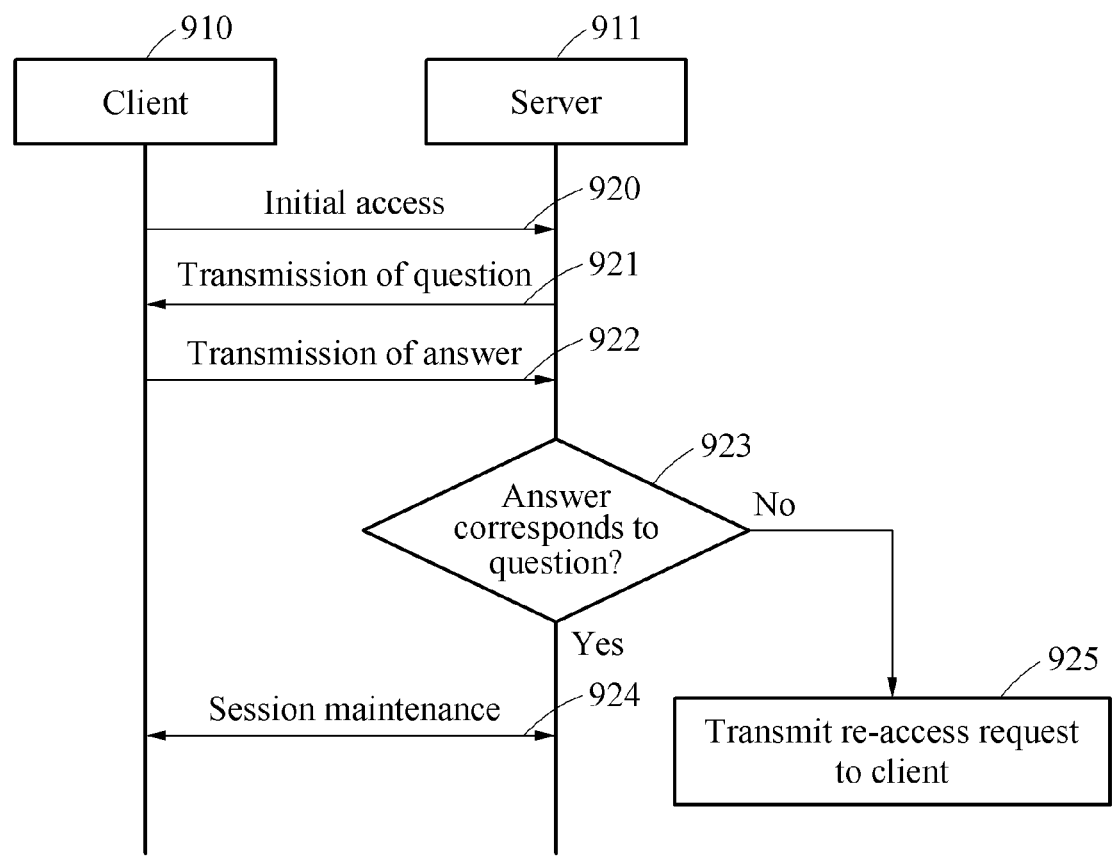
FIG. 9 is a flowchart illustrating an example of maintaining a session between a client and a server according to an embodiment.

FIG. 9 is a flowchart illustrating an operation of maintaining a session between a client and a server according to an embodiment.

Referring to FIG. 9, in operation 920, a client 910 accesses a server 911. In operation 920, the access of the client 910 may be an initial access. The server 911 may receive identification information of the client 910 from the client 910 and may verify a time value. Here, the time value may indicate a time at which the client 910 has accessed the server 911.

The server 911 may encrypt the identification information of the client 910 and the time value using $E_{server}\{\ \}$ that is an encryption scheme of the server 911. For example, the server 911 may encrypt the identification information of the client 910 and the time value using a session key.

In operation 921, the server 911 may transmit a question to the client 910. The question may be randomly generated. For example, the server 911 may transmit the encrypted identification information and time value, that is, $E_{server}\{$identification information, time value$\}$ to the client 910 as the question. That is, the client 910 may receive $E_{server}\{$identification information, time value$\}$ from the server 911.

In operation 922, the client 910 may transmit an answer to the server 911 in response to receiving the question from the server 911. For example, the client 910 may encrypt $E_{server}\{$identification information, time value$\}$ using $E_{client}\{\ \}$ that is an encryption scheme of the client 910 and may transmit $E_{client}\{E_{server}\{$identification information, time value$\}\}$ to the server 911 as the answer.

The server 911 may extract or acquire $E_{server}\{$identification information, time value$\}$ from $E_{client}\{E_{server}\{$identification information, time value$\}\}$ through decryption corresponding to $E_{client}\{\ \}$. Also, the server 911 may extract or acquire the identification information and the time value by decrypting $E_{server}\{$identification information, time value$\}$.

In operation 923, the server 911 may verify whether the question corresponds to the answer. For example, the server 911 may verify whether the identification information and the time value acquired from $E_{client}\{E_{server}\{$identification information, time value$\}\}$ corresponds to the identification information and the time value received in operation 910.

In operation 924, the server 911 may maintain a communication session with the client 910 when the answer corresponds to the question. The session may be, for example, a UDP session. In operation 925, the server 911 may transmit a re-access request to the client 910 when the answer does not correspond to the question.

In a state in which the session between the client 910 and the server 911 is maintained, the client 910 may transmit the P2P communication request to the server 911. In a state in which the session between the client 910 and the server 911 is maintained, the client 910 may perform operation 110 of FIG. 1A or operation 210 of FIG. 2.

The session maintenance described with FIG. 9 may be applicable to the client 2 and the server described with FIG. 1. In detail, in operation 129 of FIG. 1, the client 2 may access the server to notify the server of the change of the network address and may transmit identification information of the client 2 to the server. Here, the server receives the identification information of the client 2 from a third party that is mapped to another network address different from the network address of the client 2 the server is aware of. That is, the server may not be accurately aware of whether the third party is the client 2 or a hacker. The server may transmit $E_{server}\{$identification information of client 2, time value$\}$ to the third party as a question and may receive $E_{client\ 2}\{E_{server}\{$identification information of client 2, time value$\}\}$ as an answer. The server may extract the identification information of the client 2 and the time value from $E_{client\ 2}\{E_{server}\{$identification information of counterpart client, time value$\}\}$ using a decryption scheme corresponding to $E_{client\ 2}\{\ \}$ and a decryption scheme corresponding to $E_{server}\{\ \}$. That is, the answer corresponds to the question. The server may verify that the third party is the client 2 and may maintain a session with the client 2. In operation 130, the server may notify the client 1 of the change of the network address of the client 2. That is, the server may notify the client 1 that the client 2 is mapped to the other network address.

According to another embodiment, a session identifier may be used to maintain a communication session. In detail, the server 911 may allocate the session identifier to the client 910 in response to receiving the P2P communication request from the client 910. The session identifier may be used to identify the client 910 on a network. The session identifier may be included in a header of a transmission unit, for example, a packet transmitted and received between the client 910 and the server 911, the intermediary, or the counterpart client, of the client 910. Although the network address of the client 910 is changed, the server 911 may receive the transmission unit that includes the session identifier. In this case, the server 911 may maintain the communication session with the client 910.

The description made above with reference to FIGS. 1A through 8 may be applicable to the embodiment of FIG. 9 and thus, a further description is omitted. Also, the description made with reference to FIG. 9 may be applicable to the embodiments of FIGS. 1A through 8.

Figure 10A:
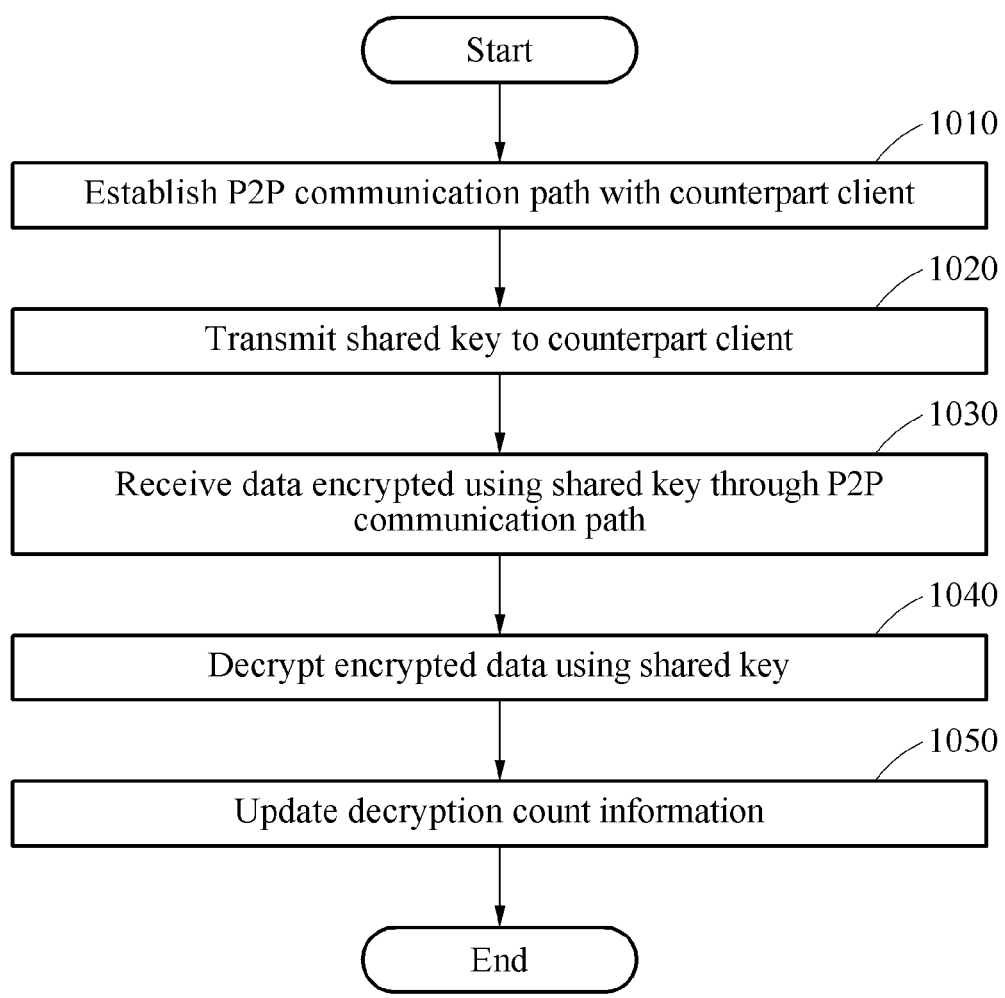
FIGS. 10A and 10B illustrate another example of a method of operating a client according to an embodiment.
Figure 10B:
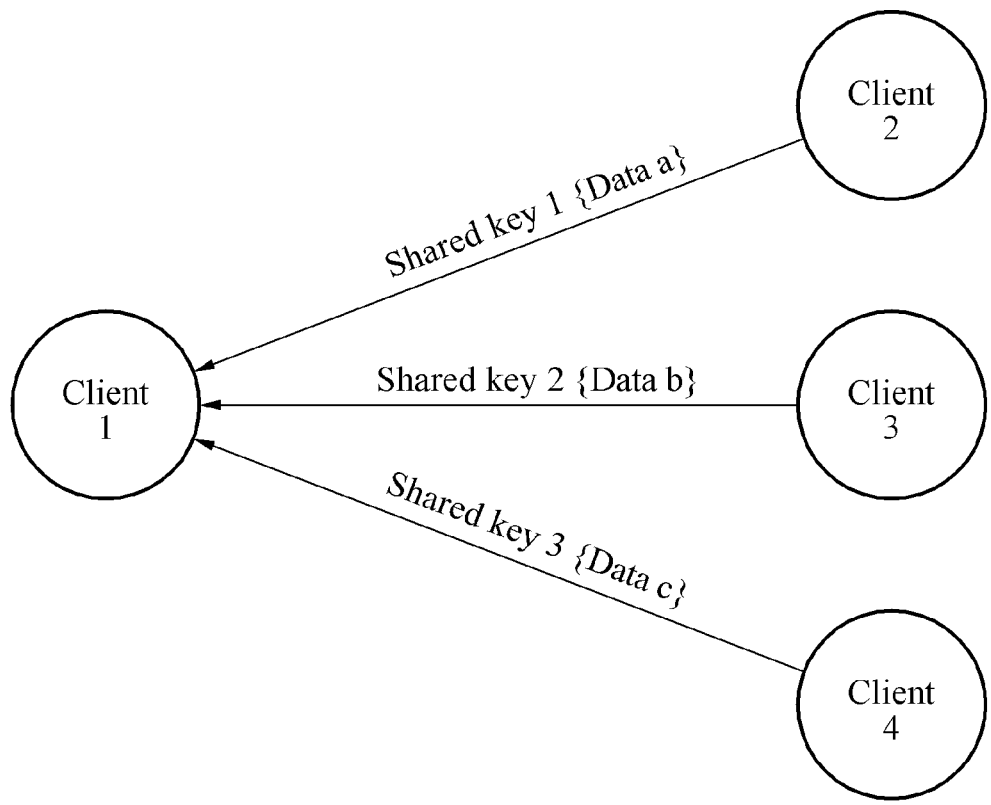

FIGS. 10A and 10B illustrate another example of a method of operating a client according to an embodiment.

FIG. 10A is a flowchart illustrating a method of operating a client.

Referring to FIG. 10A, in operation 1010, the client establishes a P2P communication path with a counterpart client.

In operation 1020, the client transmits a shared key to the counterpart client.

In operation 1030, the client receives data encrypted using the shared key through the P2P communication path.

In operation 1040, the client decrypts the encrypted data using the shared key.

In operation 1050, the client updates decryption count information associated with billing for a data use amount of the client when the data is decrypted.

The client may transmit the updated decryption count information to the server.

According to an embodiment, the server may determine the data use amount based on the updated decryption count information. For example, the server may determine the data use amount by referring to a table in which a corresponding relationship between the decryption count information and the data use amount is recorded. The server may transmit the data use amount to a billing system. The billing system may generate billing information using the data use amount.

According to another embodiment, the server may generate billing information based on the updated decryption count information. For example, the server may generate the billing information by referring to a table in which a corresponding relationship between the decryption count information and the billing information is recorded.

The server and/or the billing system may verify that the data use amount of the client exceeds a predetermined use amount. The predetermined use amount may be a data quota corresponding to a communication fee schedule that a user of the client has joined. That is, the predetermined use amount may be a data quota allocated to the client. The server and/or the billing system may generate guide information about the data use amount based on verification result information. The server and/or the billing system may transmit the guide information to the client.

The guide information may include at least one of excess information indicating whether the data use amount exceeds a predetermined use amount; remaining information indicating an available data amount excluding the data use amount from the predetermined use amount; and limit information indicating whether at least one of a bandwidth and quality of P2P communication of the client is limited. For example, when it is assumed that the predetermined use amount is 2 gigabytes (GB) and the data use amount is 1 GB, the guide information may include remaining information indicating that the remaining data amount is 1 GB. Also, the guide information may include excess information indicating that the data use amount does not exceed the predetermined use amount and/or limit information indicating that the bandwidth and/or equality of P2P communication is not limited. As another example, when it is assumed that the predetermined use amount is 2 GB and used amount information is 2.5 GB, the guide information may include excess information indicating that the used amount information exceeds the predetermined use amount, remaining information indicating that no available data amount remains, and limit information indicating that at least one of the bandwidth and quality of P2P communication is limited. Also, the guide information may include information indicating that a data use amount, 0.5 GB, exceeding the predetermined use amount will be additionally charged.

The client may visually display the guide information on a display.

According to an embodiment, the client may transmit a request for providing guide information to the server based on input information of the user and the server may transmit the guide information to the client.

According to an embodiment, the client may share a data quota allocated to the client with at least one another client. For example, when it is assumed that 5 GB is a data quota allocated to the client, the client may share the data quota of 5 GB with another client. That is, the client may generate a group and may share the data quota of the client with a client within the group. The client may receive information associated with a data use amount of the client sharing the data quota from the server and/or the client sharing the data quota, and may update decryption count information of the client based on the received information. The received information may include decryption count information updated every time the client sharing the data quota decrypts encrypted data received through P2P communication.

The description made above with reference to FIGS. 1A through 9 may be applicable to the embodiment of FIG. 10A and thus, a further description is omitted here.

Referring to FIG. 10B, a client 1 establishes a P2P communication path with each of clients 2, 3, and 4 and receives data through each P2P communication path. In detail, the client 1 receives data a encrypted using a shared key 1 from the client 2, receives data b encrypted using a shared key 2 from the client 3, and receives data c encrypted using a shared key 3 from the client 4. The shared keys 1, 2, and 3 may be identical to or may differ from one another. Alternatively, the shared keys 1 and 2 may be identical to each other and may differ from the shared key 3.

The client 1 may decrypt the data a using the shared key 1 and may update decryption count information. The client 1 may decrypt the data b using the shared key 2 and may update the decryption count information. Also, the client 1 may decrypt the data c using the shared key 3 and may update the decryption count information. Here, when it is assumed that decryption count information$_{client\ 1}$ recorded before the client 1 performs P2P communication with each of the clients 2, 3, and 4 is n, the decryption count information$_{client\ 1}$ may be updated with n+3.

The decryption count information may be information associated with a data use amount of the client 1 or billing for the data use amount. For billing, the client 1 may transmit the decryption count information of the client 1 to the server.

The description made above with reference to FIGS. 1A through 10A may be applicable to the embodiment of FIG. 10B and thus, a further description is omitted here.

Figure 11:
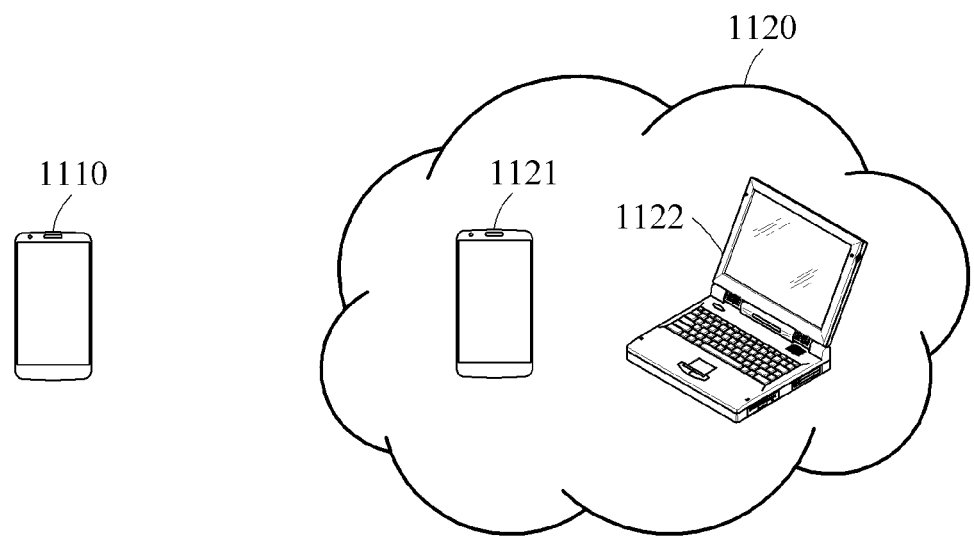
FIG. 11 illustrates an example of sharing a data quota allocated to a client according to an embodiment.

FIG. 11 illustrates an example of sharing a data quota allocated to a client according to an embodiment.

Referring to FIG. 11, a client 1110 may share a data quota of the client 1110 with a client within a group 1120.

The group 1120 may be generated based on an identifier. In detail, an identifier is allocated to communication software that enables a P2P communication of the client 1110. An identifier is allocated to the communication software that enables a P2P communication between clients 1121 and 1122.

Each of the clients 1121 and 1122 may display a visual code, for example, a quick read (QR) code for registering the client 1110 as a parent or a master on a display. For example, a key corresponding to each of the clients 1121 and 1122 may be encoded in each corresponding QR code.

The client 1110 may capture a visual code through an optical device, for example, a camera and may extract a key from a captured QR code. The client 1110 may transmit a key and an identifier of the client 1110 to the server and the server may verify whether the key is valid. For example, the server may verify whether an available count of the key is zero. When the key is valid, the server may manage the client 1110 as a master or a parent of the clients 1121 and 1122, and may manage each of the client 1121 and the client 1122 as a slave or a child of the client 1110. Identifiers of the client 1121 and the client 1122 may be grouped with the identifier of the client 1110 and thereby managed.

Also, the server may update the available count of the key.

In the example of FIG. 11, the client 1110 is the master and the clients 1121 and 1122 are slaves. The clients 1121 and 1122 may be defined as clients capable of sharing the data quota allocated to the client 1110.

The clients 1121 and 1122 may receive encrypted data through a P2P communication. The clients 1121 and 1122 may decrypt data using a shared key that is shared with a counter party, and may update decryption count information. Once the P2P communication is terminated, the clients 1121 and 1122 may transmit the decryption count information to the server and/or the client 1110. The client 1110 may receive information associated with data use amounts of the clients 1121 and 1122 and may update decryption count information of the client 1110 based on the received information. For example, when it is assumed that decryption count information of the client 1121 is 100 and decryption count information of the client 1122 is 200, the client 1110 may receive the decryption count information of each of the clients 1121 and 1122 and may add 300 to decryption count information of the client 1110.

The description made above with reference to FIGS. 1A through 10B may be applicable to the embodiment of FIG. 11 and thus, a further description is omitted here.

Figure 12:
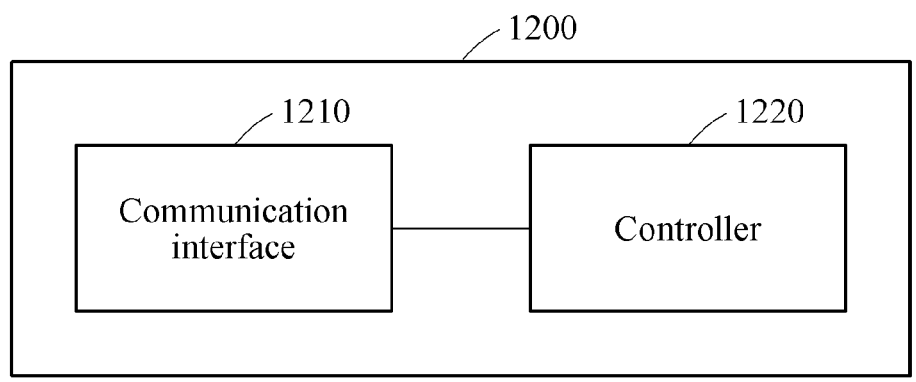
FIG. 12 is a block diagram illustrating an example of a client according to an embodiment.

FIG. 12 is a block diagram illustrating an example of a client according to an embodiment.

Referring to FIG. 12, a client 1200 includes a communication interface 1210 and a controller 1220. Also, the client 1200 includes a memory (not shown). The memory stores communication software and the controller 1220 executes the communication software.

In response to execution of the communication software, an operation of the communication interface 1210 and an operation of the controller 12720 may be performed. For example, the communication interface 1210 establishes a P2P communication path with a counterpart client. The communication interface 1210 transmits a shared key to the counterpart client and receives data encrypted using the shared key through the P2P communication path. The controller 1220 decrypts the encrypted data using the shared key. When the data is decrypted, the controller 1220 updates decryption count information associated with a data use amount of the client. Billing information may be generated through the communication software.

The decryption count information may be stored in a memory and/or a security call dongle.

The description made above with reference to FIGS. 1 through 11 may be applicable to the embodiment of FIG. 12 and thus, a further description is omitted here.

Figure 13:
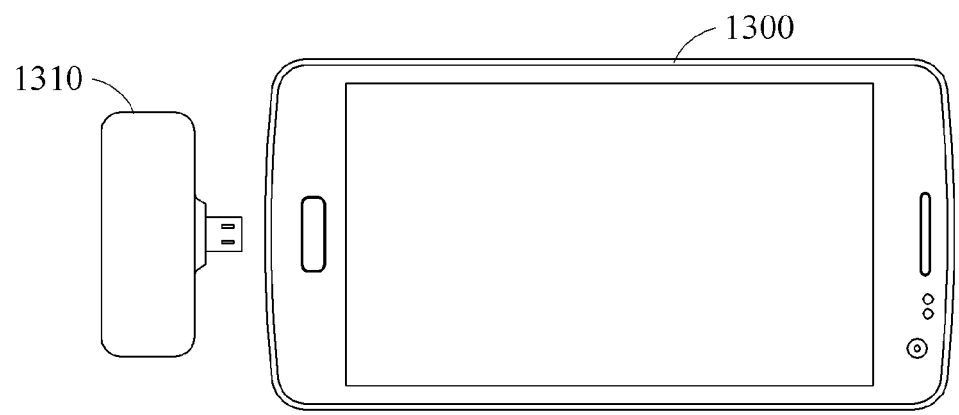
FIG. 13 illustrates an example of a security call dongle according to an embodiment.

FIG. 13 illustrates an example of a security call dongle according to an embodiment.

An example of a client 1300 and a security call dongle 1310 will be described with reference to FIG. 13.

The security call dongle 1310 may be designed to be detachably provided to an input/output (I/O) interface of the client 1300. The I/O interface may include micro universal serial bus (USB) port, a lightning port of Apple®, and the like. The security call dongle 1310 may be designed to be compatible with various I/O interfaces to be developed in the future.

The security call dongle 1310 and the client 1300 may be connected through short range wireless communication without a physical contact. The short range wireless communication may include, for example, Bluetooth, near field communication (NFC), wireless fidelity (Wi-Fi), and the like. The example of the short range wireless communication is not limited thereto.

The security call dongle 1310 may include a memory with predetermined capacity. The communication software, a call history made using the communication software, a messaging history, message contents, an attachment file, and the like may be stored in the memory.

The security call dongle 1310 may include a battery with predetermined battery. When the battery of the client 1300 is insufficient, the security call dongle 1310 may supply the client 1300 with power that is sufficient to make a call for a predetermined time or more. Here, when the security call dongle 1310 is connected to the client 1300 without a physical contact, the security call dongle 810 may wirelessly transmit the power to the client 1300.

When the security call dongle 1310 is connected to the client 1300, the communication software may be visually displayed on a display of the client 1300. As another example, when the security call dongle 1310 is connected to the client 1300, the communication software may be executed.

The security call dongle 1310 including the memory that stores an identifier corresponding to the communication software may be distributed. When the communication software is installed in the client 1300 and the security call dongle 1310 is connected to the client 1300, an identifier required for a secure call may be allocated to the communication software.

Decryption count information of the client 1300 may be stored in the security call dongle 1310. For example, in a state in which the security call dongle 1310 is connected to the client 1300, the client 1300 may receive encrypted data through a P2P communication, and may update decryption count information every time data is decrypted and may store the updated decryption count information in the security call dongle 1310.

Messages and/or contents transmitted and received through a chatroom may be stored in the security call dongle 1310. Attributes may be defined in data such as messages and/or contents. The data may or may not move to an outside of the security call dongle 1310. In response to an occurrence of an event for data stored in the security call dongle 1310, the event may be performed when a user receives a permission from an original owner of the data. For example, when the client 1300 obtains a permission to move a corresponding file from an original owner or a security manager of the corresponding file, the client 1300 may transmit the file stored in the security call dongle 1310 to an outside. That the corresponding file is stored in the security call dongle 1310 may indicate that an allocated identifier is recorded in a server. Here, the identifier indicates an identifier allocated to the corresponding file. The client 1300 may transmit, to a client of the original owner or the security manager, a message indicating that the corresponding file is to be transmitted or moved to an outside. When the original owner or the security manager approves transmission or movement of the corresponding file, an attribute of the corresponding file may be redefined or corrected. Accordingly, the corresponding file may be transmitted or moved to an outside of the security call dongle 1310.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of operating a communication device, the method comprising:
   generating an intermediary key corresponding to a peer-to-peer (P2P) communication between a client and a counterpart client;
   transmitting the intermediary key to the counterpart client;
   receiving the intermediary key from the client that obtains the intermediary key;
   establishing an intermediary path in response to receiving the intermediary key, wherein the intermediary path is a path for coping with disconnection of the P2P communication;
   receiving, from the client that does not receive an acknowledgement to data transmitted to the counterpart client due to a change of a network address of the counterpart client, the data through the intermediary path; and
   transmitting the data to the counterpart client when the counterpart client is accessed using the intermediary key,
   wherein the intermediary key is common to the client and the counterpart client.

2. The method of claim 1, wherein the generating of the intermediary key comprises generating the intermediary key in response to connection to the counterpart client that receives a P2P communication request of the client from a server.

3. The method of claim 2, wherein the server receives the intermediary key from the counterpart client and transmits the intermediary key to the client.

4. The method of claim 1, wherein the intermediary path includes a dedicated room of the client and the counterpart client that maintain the intermediary key.

5. The method of claim 1, wherein the transmitting of the data to the counterpart client comprises:
   receiving an access request including the intermediary key from the counterpart client having the changed network address; and
   allowing an access in response to the access request based on the intermediary key.

6. The method of claim 1, wherein the intermediary key corresponds to a threshold or is generated based on unique information of the client and the counterpart client.

7. The method of claim 1, wherein the client receives an acknowledgement to data received by the counterpart client from the communication device and transmits data to the changed network address of the counterpart client.

8. A communication device, the method comprising:
a communication interface; and
a processor coupled to the communication interface, wherein the processor configured to:
generate an intermediary key corresponding to a peer-to-peer (P2P) communication between a client and a counterpart client,
transmit the intermediary key to the counterpart client via the communication interface,
receive, via communication interface, the intermediary key from the client that obtains the intermediary key,
establish an intermediary path in response to receiving the intermediary key, wherein the intermediary path is a path for coping with disconnection of the P2P communication,
receive, from the client that does not receive an acknowledgement to data transmitted to the counterpart client due to a change of a network address of the counterpart client, the data through the intermediary path, and
transmit, via communication interface, the data to the counterpart client when the counterpart client is accessed using the intermediary key,
wherein the intermediary key is common to the client and the counterpart client.

9. The apparatus of claim 8, wherein the processor is further configured to generate the intermediary key in response to connection to the counterpart client that receives a P2P communication request of the client from a server.

10. The apparatus of claim 9, wherein the server receives the intermediary key from the counterpart client and transmits the intermediary key to the client.

11. The apparatus of claim 8, wherein the intermediary path includes a dedicated room of the client and the counterpart client that maintain the intermediary key.

12. The apparatus of claim 8, wherein the processor is further configured to:
receive, via the communication interface, an access request including the intermediary key from the counterpart client having the changed network address, and
allow an access in response to the access request based on the intermediary key.

13. The apparatus of claim 8, wherein the intermediary key corresponds to a threshold or is generated based on unique information of the client and the counterpart client.

14. The apparatus of claim 8, wherein the client receives an acknowledgement to data received by the counterpart client from the communication device and transmits data to the changed network address of the counterpart client.

\* \* \* \* \*